US007755667B2

(12) United States Patent
Rabbani et al.

(10) Patent No.: US 7,755,667 B2
(45) Date of Patent: Jul. 13, 2010

(54) IMAGE SEQUENCE STABILIZATION METHOD AND CAMERA HAVING DUAL PATH IMAGE SEQUENCE STABILIZATION

(75) Inventors: Majid Rabbani, Pittsford, NY (US); Aaron T. Deever, Pittsford, NY (US); Gabriel Fielding, Rochester, NY (US); Robert Gretzinger, Rush, NY (US)

(73) Assignee: Eastman Kodak Company, Rochester, NY (US)

(*) Notice: Subject to any disclaimer, the term of this patent is extended or adjusted under 35 U.S.C. 154(b) by 1425 days.

(21) Appl. No.: 11/130,690

(22) Filed: May 17, 2005

(65) Prior Publication Data
US 2006/0274156 A1 Dec. 7, 2006

(51) Int. Cl.
H04N 5/228 (2006.01)
H04N 5/222 (2006.01)
G03B 17/00 (2006.01)

(52) U.S. Cl. .............................. 348/208.6; 348/333.01; 396/55

(58) Field of Classification Search .............. 348/208.6, 348/208.13, 333.01; 396/55
See application file for complete search history.

(56) References Cited

U.S. PATENT DOCUMENTS

| | | | |
|---|---|---|---|
| 3,971,065 A | 7/1976 | Bayer | |
| 5,107,293 A | 4/1992 | Sekine et al. | |
| 5,172,226 A | 12/1992 | Morimora et al. | |
| 5,289,274 A | 2/1994 | Kondo | |
| 5,510,834 A | 4/1996 | Weiss et al. | |
| 5,581,404 A | 12/1996 | Misaka et al. | |
| 5,629,988 A * | 5/1997 | Burt et al. .............. | 348/E5.046 |
| 5,648,815 A | 7/1997 | Toba | |
| 5,748,231 A | 5/1998 | Park et al. | |
| 6,128,047 A | 10/2000 | Chang et al. | |
| 6,130,912 A * | 10/2000 | Chang et al. ............ | 348/E5.066 |
| 6,172,707 B1 * | 1/2001 | Ouchi et al. ............. | 348/208.6 |
| 6,628,711 B1 * | 9/2003 | Mathew et al. ........... | 348/208.4 |
| 7,042,507 B2 * | 5/2006 | Sato et al. ............... | 348/208.6 |
| 2005/0168581 A1 * | 8/2005 | Shinohara et al. ........ | 348/208.1 |
| 2005/0179784 A1 * | 8/2005 | Qi ......................... | 348/208.1 |

FOREIGN PATENT DOCUMENTS

EP 0 845 699 6/1998

(Continued)

OTHER PUBLICATIONS

Litvin A et al, Probabilisitic Video Stabilization Using Kalman Filtering and Mosaicking, Proceedings of the SPIE-IS&T Electronic Imaging, SPIE vol. 5022 (2003), pp. 663-674, XP-002398793.

(Continued)

*Primary Examiner*—Nhan T Tran
(74) *Attorney, Agent, or Firm*—Robert L. Walker

(57) ABSTRACT

In an image sequence stabilization method and a camera, a sequence of input digital images are captured. The sequence of input digital images is replicated to provide a corresponding sequence of archival images and a corresponding sequence of display images. The archival image sequence is automatically stabilized to provide a stabilized archival image sequence. The display image sequence is automatically stabilized to provide a stabilized display image sequence. The stabilization methods used for the two sequences are different, although both can be digital.

27 Claims, 14 Drawing Sheets

FOREIGN PATENT DOCUMENTS

| | | |
|---|---|---|
| EP | 1 117 251 A1 | 12/2000 |
| WO | 2004/062270 | 7/2004 |

OTHER PUBLICATIONS

Haas, D Die Electronische Ruhige Hand, Funkschau, Weka Fachzeitschriften Verlag, Poing, DE, vol. 63, No. 9, Apr. 19, 1991, pp. 60-61.

"Applications and Requirements for Scalable Video Coding", Jan. 2005, pp. 1-31, OX002398794, ISO/IEC JTC1/SC29/WG11 N6880, Hongkong, China.

Kenya Uomori et al., "Automatic Image Stabilizing System by Full-Digital Signal Processing", IEEE Transactions on Consumer Electronics, 36(3), Aug. 1990, pp. 510-519.

Ken Sauer and Brian Schwartz, "Efficient Block Motion Estimation Using Integral Projections", IEEE Transactions on Circuits and Systems for Video Technology, vol. 6, No. (5), Oct. 1996, pp. 513-518.

Krishna Ratakonda, "Real-time Digital Video Stabilization for Multi-media Applications", IEEE International Symposium on Circuits and Systems, 1998, vol. 4, pp. IV-69-72.

Alin C. Popescu and Hany Farid, "Exposing Digital Forgeries by Detecting Traces of Resampling", IEEE Transactions on Signal Processing, vol. 53, No. 2, Feb. 2005, pp. 758-767.

* cited by examiner

IMAGE SEQUENCE STABILIZATION METHOD AND CAMERA HAVING DUAL PATH IMAGE SEQUENCE STABILIZATION

FIELD OF THE INVENTION

The present invention relates in general to digital cameras and digital imaging more particularly to image sequence stabilization methods and to cameras and methods having dual paths for detecting and removing jitter from a digital image sequence.

BACKGROUND OF THE INVENTION

Image sequences, captured with devices such as digital still or video cameras, often contain undesirable motion, referred to as jitter, between images. As an example, video captured with a hand-held video camera often exhibits some shake or jitter from frame to frame, despite the user's best efforts to hold the camera steady.

Several different approaches have been proposed for jitter removal from digital image sequences. Optical stabilizers act on light images prior to capture. For example, U.S. Pat. No. 5,581,404, describes an oscillating gyroscope and rotating prism lens used as part of a mechanism to detect and correct for angular velocity in the camera. Optical stabilization is effective, but at the cost of additional camera weight, extra components, and required power. These requirements go against the general trend of miniaturization in cameras.

Stabilization can also be accomplished by determining camera motion either electronically or digitally, and compensating for this motion by selecting an appropriately offset image region from an oversized electronic imager or image sensor, such as a CCD or CMOS imager. An electronic imager is "oversized" when the imager captures a greater field of view than is presented in output images. Reduced size images can be provided for archival storage and for display in an electronic viewfinder or other camera display during capture.

Electronic stabilization systems use motion sensing transducers to detect actual camera motion, which is then used to locate an output window relative to images produced by an oversized imager. Electronic stabilization is typically performed in-camera and has the shortcomings of the weight and cost of the transducers.

With digital stabilization, the actual camera motion must be estimated from the captured image sequence. This approach has low cost because no external motion sensors are required. Digital stabilization has had performance challenges relative to optical or electronic stabilization, because digital stabilization presents a large computational burden and image content can confound digital motion estimation required for stabilization.

Digital stabilization can be performed in-camera or off-line. Each approach has its own advantages and disadvantages. In-camera digital stabilization is constrained in terms of available processing capability. Off-line digital stabilization has the advantage that computational resources are less likely to be constrained.

In-camera digital stabilization is readily automated, since stabilization steps are performed in the camera and can provide output to the photographer during image sequence capture. Off-line stabilization is less convenient. Typically, the user is required to perform an additional procedure with appropriate software to achieve stabilized video. A further problem is that image sequences received for stabilization are likely to have been through one or more compression-decompression cycles. This presents an increased risk of artifacts in the stabilization process.

With off-line digital stabilization, output images are transferred and, during stabilization, are reduced in field of view. This raises an issue of user expectations, since the user is likely to have viewed the output images before the reduction in field of view. An additional issue, particularly in terms of user expectations, is that resolution is also reduced, unless an additional interpolation procedure is provided following stabilization.

In-camera stabilization, can provide stabilized images to a viewfinder during capture of an image sequence, but, in doing so, is limited to algorithms that do not use future frames. This leads to poor performance in identifying intentional motion such as camera pans. With off-line digital stabilization, the entire image sequence is available at the time of stabilization. This allows use of algorithms that exploit data from both future frames and previous frames when stabilizing a given frame.

With digital stabilization, the actual camera motion must be estimated from the captured video stream. This can be difficult, as it is necessary to distinguish object movement from camera movement. The first step is to estimate the motion between frames. This is followed by trajectory estimation, which computes an estimate of the desired camera motion (usually by assuming that hand shake is higher frequency than the desired motions). Jitter is estimated based on the overall motion and desired camera motion estimates, and is then compensated for through an image shift or warp function.

Many or most digital stabilization techniques use some form of block-matching for motion estimation. Block-matching divides an image into a collection of blocks, and for each block finds the best matching region in the previous image. Once a motion estimate has been obtained for each block, a set of rules must be applied to convert these local estimates into a single global estimate of the motion. Because block-based motion estimation obtains local motion estimates from different regions throughout the image, it can be very robust to independent moving objects within a scene. One technique used to eliminate incorrect motion estimates is to form a histogram of all of the local motion estimates, and eliminate all values that occur infrequently. Other local estimates may be eliminated if they are considered unreliable due to causes such as the block containing repeating patterns or very few edges. Once the local estimates have been pruned such that only reliable estimates remain, typically the median or mean is chosen as the global motion estimate.

Uomori et al, "Automatic Image Stabilizing System by Full-Digital Signal Processing", *IEEE Transactions on Consumer Electronics*, 36(3), August 1990, pages 510-519, discloses digital stabilization and use of specific temporal filters in jitter removal. Other disclosures of digital filtering techniques include U.S. Pat. Nos. 5,172,226; 5,748,231; 5,648, 815; 5,510,834; and 5,289,274. U.S. Pat. No. 5,748,231 discloses techniques relating to failure conditions of motion vectors. These techniques all employ a digital motion estimation unit to estimate the global motion between images in the sequence, and a jitter calculation algorithm to determine what component of the estimated motion is jitter rather than an intended pan.

The above block-based digital stabilization techniques and related techniques are satisfactory in many respects. The approach has low cost because the algorithm is entirely software based. Block-based techniques have the advantage of capturing a relatively large amount of local information and being relatively robust to factors such as independently moving objects in the scene. On the other hand, block-based techniques are computationally complex. This presents performance challenges relative to optical or electronic stabilization and limits usefulness in applications with limited computational resources, such as currently available, moderately priced digital cameras.

Some of the above techniques consider rotations, warping and general affine transformations in estimating motion. These approaches result in requirements of extensive computational resources, both in the computation of the motion, and in the subsequent interpolation required to offset the image based on the computed jitter motion.

U.S. Pat. Nos. 6,130,912 and 6,128,047 disclose the use of integral projection for motion estimation. A block-based motion estimate is disclosed in "Efficient Block Motion Estimation Using Integral Projections", K. Sauer and B. Schwartz, *IEEE Trans. On Circuits and Systems for Video Technology*, 6(5), 1996, pages 513-518. The integral projections are within a block-matching framework and are subject to the limitations of block-based techniques.

The use of full frame integral projections in computing a global expansion of a block-based motion estimate is disclosed in "Real-time Digital Video Stabilization for Multimedia Applications", K. Ratakonda, *IEEE Int'l Symposium on Circuits and Systems*, 1998, vol. 4, pages 69-72. Full frame integral projections operate by projecting a two-dimensional image onto two one-dimensional vectors, one horizontal and one vertical. This can be achieved by summing the elements in each column to form the horizontal projection, and summing the elements in each row to form the vertical projection. Full frame integral projections reduce the problem of two-dimensional global motion estimation into two independent one-dimensional motion estimation problems, significantly reducing computational complexity. Ratokonda's paper also discloses computational improvements in the use of full-frame integral projections through sub-sampling and interpolation-based one-half pixel accuracy. These techniques have the shortcoming that a non-causal filter is used.

Though satisfactory in many respects, the known digital and electronic image sequence stabilization algorithms are associated with numerous drawbacks, including inadequate performance and excessive computational complexity.

It would thus be desirable to provide cameras and methods, which provide improved digital stabilization of image sequences with limited computational resources.

SUMMARY OF THE INVENTION

The invention is defined by the claims. The invention, in broader aspects, provides an image sequence stabilization method and camera, in which sequences of input digital images are captured. The sequence of input digital images is replicated to provide a corresponding sequence of archival images and a corresponding sequence of display images. The archival image sequence is automatically stabilized to provide a stabilized archival image sequence. The display image sequence is automatically stabilized to provide a stabilized display image sequence. The stabilization methods used for the two sequences are different, although both can be digital.

It is an advantageous effect of the invention that improved methods and apparatus are provided, which have digital image sequence stabilization that achieves good performance with relatively low computation demands.

It is also an advantageous effect of the invention that improved cameras and methods are provided, which provide improved digital stabilization of image sequences with limited computational resources by use of dual stabilization paths.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
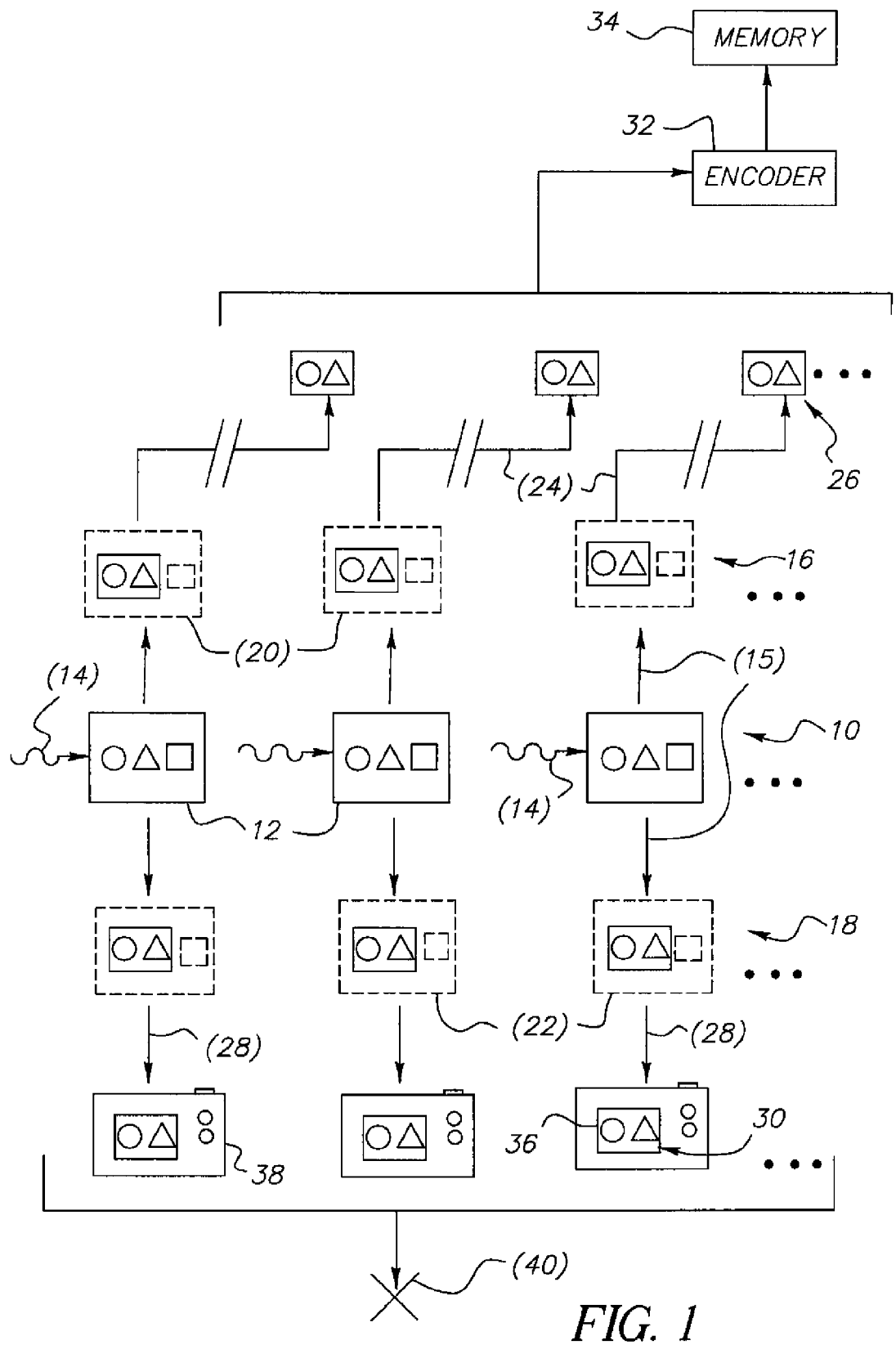
FIG. 1 is a diagrammatical view of an embodiment of dual path stabilization.

In the following, methods and apparatus are generally described in relation to embodiments of the invention that provide stabilization of image sequences using two different stabilization paths. One of the stabilization paths can use a method of fast digital stabilization of image sequences that uses moderate processing resources. The digital stabilization operates on a sequence of captured oversized image frames. An estimate of the global motion between image frames is determined. The motion estimates are analyzed to determine what part of the motion is desired, due to for example a panning motion, and what part of the motion is unintentional jitter. Each image frame is cropped using a window of predetermined size. The location of the window relative to each oversized image frame is adjusted, as necessary, to compensate for the computed jitter.

Some portions of the following are presented in terms of algorithms and symbolic representations of operations on data bits within a computer memory. These algorithmic descriptions and representations are used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. For convenience, these signals are sometimes referred to herein in relation to the underlying information using referents such as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, terms such as "processing" or "computing" or "calculating" or "determining" or "forming" or the like, are used to refer to the action and processes of a computer system, or similar data processing device, that manipulates and transforms data represented as physical (e.g. electronic) quantities within the computer system's registers and memories into other data similarly represented as physical quantities within the computer system memories or registers or other such information storage, transmission or display devices.

Particular embodiments herein are cameras. The methods can also be performed using other systems. In both cases, the systems can include specific pieces of apparatus for performing the operations described herein. Apparatus such as a camera or programmable computer may be specially constructed for the required purposes, or may comprise a general purpose system selectively activated or reconfigured by a stored computer program.

The methods presented herein are not limited to any particular computer or camera or other apparatus. Various general purpose systems may be used with programs in accordance with the teachings herein, or it may prove convenient to construct more specialized apparatus to perform the methods. The structure for a variety of these systems will appear from the description below. In addition, the present invention is not described with reference to any particular programming language. It will be appreciated that a variety of programming languages may be used to implement the teachings of the invention as described herein.

In the following description, some embodiments of the present invention will be described as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

The computer program for performing the method of the present invention may be stored in a computer readable storage medium. This medium may comprise, for example: magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of a local or remote network or other communication medium. Those skilled in the art will readily recognize that the equivalent of such a computer program product may also be constructed in hardware or firmware known as application specific integrated circuits (ASICs). An ASIC may be designed on a single silicon chip to perform the method of the present invention. The ASIC can include the circuits to perform the logic, microprocessors, and memory necessary to perform the method of the present invention. Multiple ASICs may be envisioned and employed as well for the present invention.

A computer or machine-readable medium includes any item for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Figure 14:
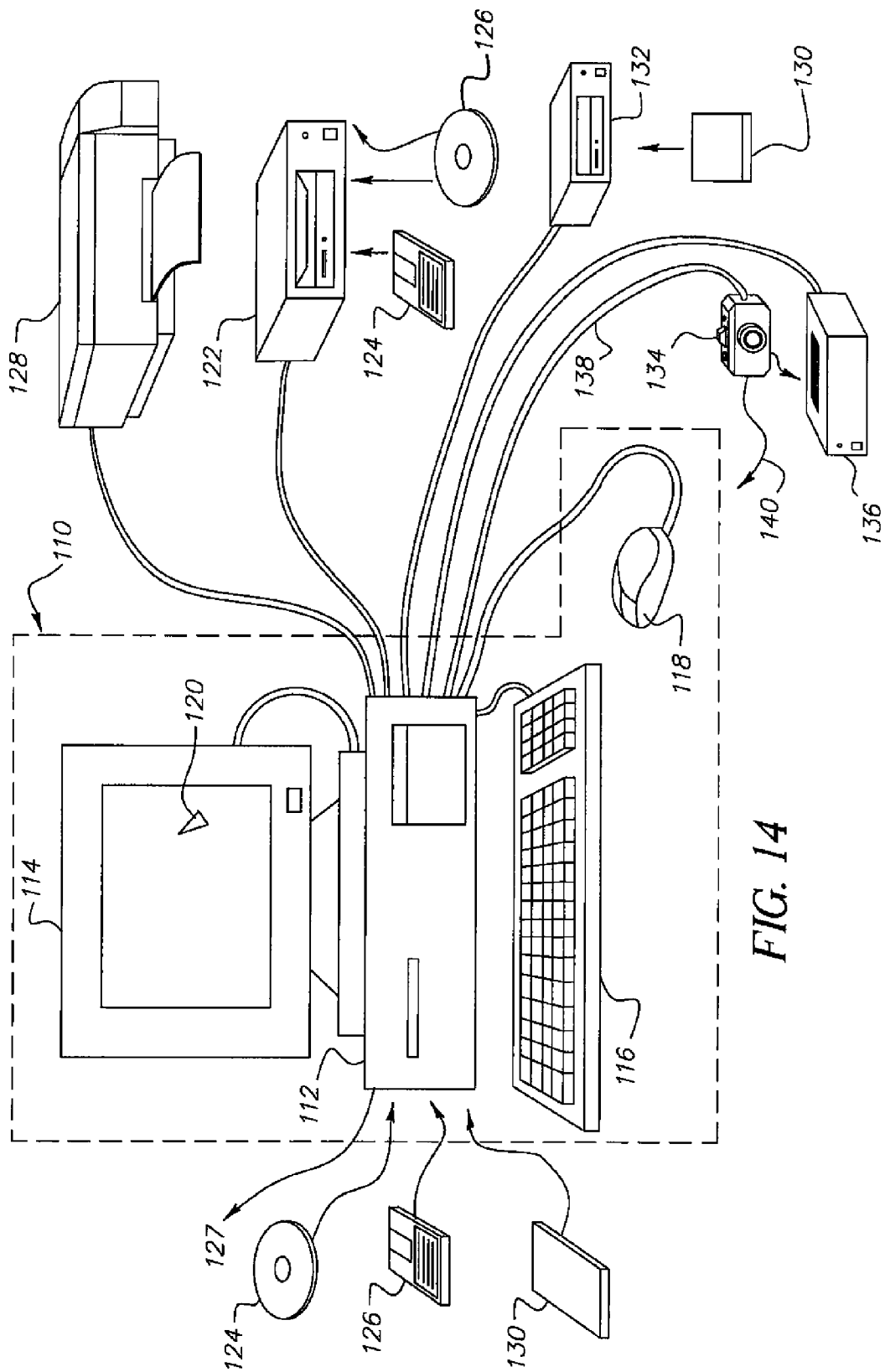
FIG. 14 is a diagrammatical view of an embodiment of the system.

Embodiments of the present invention can be implemented in computer hardware and computerized equipment, such as a digital camera, a digital scanner, and on a personal computer. Referring to FIG. 14, there is illustrated a computer system 110 for implementing the present invention. The present invention is not limited to a computer system 110 as shown. Embodiments of the invention may be used on any electronic processing system such as found in digital cameras, home computers, kiosks, retail or wholesale photofinishing, or any other system for the processing of digital images. The computer system 110 includes a microprocessor-based unit 112 for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 124, or other portable memory medium, which typically includes software programs, is inserted into the microprocessor based unit for providing a means of inputting the software programs and other information to the microprocessor based unit 112. Similarly, a floppy disk 126 may also include a software program, and is inserted into the microprocessor-based unit 112 for inputting the software program. The compact disk-read only memory (CD-ROM) 124 or the floppy disk 126 may alternatively be inserted into externally located disk drive unit 122, which is connected to the microprocessor-based unit 112. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 may also be connected to the microprocessor-based unit 112 for printing a hardcopy of the output from the computer system 110.

Images may also be displayed on the display 114 via a personal computer card (PC card) 130 or other memory card or the like, which contains digitized images electronically embodied in the card 130. The card 130 is ultimately inserted into the microprocessor-based unit 112 for permitting visual display of the image on the display 114. Alternatively, the card 130 can be inserted into an externally located card reader 132 connected to the microprocessor-based unit 112. Image sequences may also be input via the compact disk 124, the floppy disk 126, or the network connection 127. Any image sequences stored in the card 130, the floppy disk 126 or the compact disk 124, or input through the network connection 127, may have been obtained from a variety of sources, such as a digital camera (not shown) or a scanner (not shown). Images sequences may also be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112.

The output device can provide a final image that has been subject to transformations. The output device can be a printer or other output device that provides a hard copy final image. The output device can also be an output device that provides the final image as a digital file. The output device can also include combinations of output, such as a printed image and a digital file on a memory unit, such as a CD or DVD.

The present invention can be used with multiple capture devices that produce digital images. For example, FIG. 14 can represent a digital photofinishing system where the image-capture device is a conventional photographic film camera for capturing a scene on color negative or reversal film, and a film scanner device for scanning the developed image on the film and producing a digital image. The capture device can also be an electronic capture unit (not shown) having an electronic imager, such as a charge-coupled device or CMOS imager. The electronic capture unit can have an analog-to-digital converter/amplifier that receives the signal from the electronic imager, amplifies and converts the signal to digital form, and transmits the image signal to the microprocessor-based unit 112.

The microprocessor-based unit 112 provides means for processing the digital images to produce pleasing looking images on the intended output device or media. The present invention can be used with a variety of output devices that can include, but are not limited to, a digital photographic printer and soft copy display. The microprocessor-based unit 112 can be used to process digital images to make adjustments for overall brightness, tone scale, image structure, etc. of digital images in a manner such that a pleasing looking image is produced by an image output device. Those skilled in the art will recognize that the present invention is not limited to just these mentioned image processing functions.

A digital image includes one or more digital image channels or color components. Each digital image channel is a two-dimensional array of pixels. Each pixel value relates to the amount of light received by the imaging capture device corresponding to the physical region of pixel. For color imaging applications, a digital image will often consist of red, green, and blue digital image channels. Motion imaging applications can be thought of as a sequence of digital images. Those skilled in the art will recognize that the present invention can be applied to, but is not limited to, a digital image channel for any of the herein-mentioned applications. Although a digital image channel is described as a two dimensional array of pixel values arranged by rows and columns, those skilled in the art will recognize that the present invention can be applied to non rectilinear arrays with equal effect. Those skilled in the art will also recognize that for digital image processing steps described hereinbelow as replacing original pixel values with processed pixel values is functionally equivalent to describing the same processing steps as generating a new digital image with the processed pixel values while retaining the original pixel values.

The general control computer shown in FIG. 14 can store some embodiments of the present invention as a computer program product having a program stored in a computer readable storage medium, which may include, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device. Computer program products of the present invention can be utilized on any well-known computer system, such as a personal computer.

Embodiments of the present invention can be implemented in a combination of software and/or hardware and is not limited to devices, which are physically connected and/or located within the same physical location. For example, one or more of the devices or parts of the devices illustrated in FIG. 14 can be located remotely and can be connected via a network. One or more of the devices or parts of the devices can be connected wirelessly, such as by a radio-frequency link, either directly or via a network.

It will be understood that the circuits shown and described can be modified in a variety of ways well known to those of skill in the art. It will also be understood that the various features described here in terms of physical circuits can be alternatively provided as firmware or software functions or a combination of the two.

Embodiments of the present invention may be employed in a variety of user contexts and environments. Exemplary contexts and environments include, without limitation, wholesale digital photofinishing, retail digital photofinishing desktop software (software that applies algorithms to digital images), digital fulfillment (digital images in—from media or over the web, digital processing, with images out—in digital form on media, digital form over the web, or other form), kiosks, mobile devices, and as a service offered via a local or large area network, such as the Internet.

Image capture and stabilization can be in the same device or component or separate devices or components. For example, image capture and stabilization can all be in a cellular phone or other mobile terminal. Similarly, image capture and display path stabilization can be in a cellular phone and archival stabilization can be provided somewhere in a telephone/data network, or at an imaging service provider.

In any cases, the invention may stand alone or may be a component of a larger system solution. Furthermore, human interfaces, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the method of the invention can be fully automatic, may have user input (be fully or partially manual), may have user or operator review to accept/reject the result, or may be assisted by metadata (metadata that may be user supplied, supplied by a measuring device (e.g. in a camera), or determined by an algorithm). Moreover, the algorithm(s) may interface with a variety of workflow user interface schemes.

The invention is generally described herein in terms of stabilization of an image sequence captured in a digital video camera. This is a matter of convenience. Like considerations apply to other embodiments, such as, image sequences captured by a mobile multimedia communication device or scanned from a film sequence.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art.

Dual Path Stabilization

Referring now to FIGS. 1-4, in particular embodiments, image sequences are stabilized using two different stabilization paths. One stabilization path (hereafter "archival path") culminates in storage of a second stabilized image sequence. The other stabilization path (hereafter "display path") culminates in display of a first stabilized image sequence, for example, on a liquid crystal display (LCD) on the back of a camera during capture of the image sequence. The stabilization procedures of the two paths are different and, depending upon input, so are the resulting stabilized image sequences. The following is generally directed to embodiments in which both paths use digital stabilization. As an alternative, either of both paths can utilize one or more other types of image stabilization, such as optical stabilization. For example, in optical stabilization, a rotating prism lens can be used to compensate for jitter by adjusting the light incident on the image sensor. The resulting stabilized sequence is replicated. One copy is used directly. The other copy is further stabilized with digital stabilization. On the archival path, several image frames can be buffered, and for a given frame, motion estimates computed from previous, current, and future frames can be analyzed along with the known lens adjustments to determine if the stabilization can be improved by an additional offset of the sensor data to be encoded. Similarly, the second stabilization path can be used to provide additional stabilization correction beyond an initial electronic stabilization step.

With digital stabilization on both paths, it is preferred that the stabilization provided by each path is completely independent of the stabilization provided by the other path. This allows freedom in optimization of each path for its intended purposes: the display path for speed and low computational needs, the archival path for quality.

The following is also generally directed to embodiments, in which both stabilization paths are provided in a digital video camera or camera-equipped portable device, such as a mobile multimedia communication device. Dual path stabilization is particularly advantageous for, but is not limited to such self-contained portable apparatus. For example, the display path can be provided in a portable device and the archival path can be provided, automatically, in another apparatus in communication with the portable device via a wired or wireless network.

Referring now to FIG. 1, in an embodiment of the method, a sequence 10 of input digital images 12 is captured (14) and corresponding sequences 16,18 of archival images 20 and display images 22 are produced (15). The archival image sequence 16 is automatically stabilized (24) to provide a stabilized archival image sequence 26. The display image sequence 18 is automatically stabilized (28) differently to provide a stabilized display image sequence 30. The stabilized archival image sequence 26 is encoded by an encoder 32 and is then stored in memory 34. The stabilized display image sequence 30 is displayed on a camera display 36 of a camera 38. After display, images of the stabilized display image sequence 30 are discarded (40).

The stabilization of the display image sequence is quicker than the stabilization of the archival image sequence. The stabilization of the archival image sequence is more accurate than the stabilization of the archival image sequence. The two stabilization paths can share features, but this is not preferred. It is preferred that the archival path be independent of the time constraints imposed on the display path and the display path be independent of the quality constraints imposed on the archival path.

It is preferred, for camera use, that the display image sequence stabilization is so fast as to provide a stabilized image sequence concurrent with capture, that is, in or near real-time. In some embodiments, the processing time for the stabilizing of the display image sequence is shorter than or equal to the frame rate of image capture. Times longer than this create an accumulating delay in presenting the stabilized display images, which becomes noticeable to the user and then increasingly distracting as the delay increased during image sequence capture.

A limitation of displaying the stabilized display image sequence during capture is that future image frames are unavailable for use in stabilization, since those frames have not yet been captured. This limits the display image sequence stabilization, in such embodiments, to use of past and current frames, in stabilizing each frame of a sequence, in embodiments in which the stabilized display image sequence is provided to the photographer for use in aiming the camera during image sequence capture.

Dual path stabilization is useful in any system, in which it would be beneficial to provide a rapid, relatively inaccurate image sequence stabilization along with a slower, more accurate stabilization. For example, a computer program can display a quick estimate of stabilization results prior to and/or during a slower, higher quality archival image sequence stabilization. In such non-capture embodiments, there may or may not be a distinction between paths on which frames are used in the stabilizations.

The second stabilization path culminates in storage of the stabilized image sequence data. Compression can be provided to save memory. The second stabilization path is not under strict time constraints. As a result, the efficiency of the encoding routine used for compression and the manner of storage and retrieval are matters of convenience. The second stabilization is free of the time-critical operation, display on a viewfinder or camera display during capture.

The two stabilization paths can share features, but this is not preferred. It is preferred that the archival path be independent of the time constraints imposed on the display path and the display path be independent of the quality constraints imposed on the archival path. In the archival path, camera jitter for a given frame is computed based on motion estimates from past, current and future frames. The region of the sensor image data representing the stabilized image is offset to compensate for the computed jitter. The stabilized region in the second stabilization path will differ from the stabilized region chosen for display in the first stabilization path in some cases, depending upon both jitter and intentional camera movement.

The longer time available for stabilization of the archival image sequence allows more accuracy. In particular embodiments, the archival image stabilization is both forward-looking and rearward-looking, while the display image stabilization is only rearward-looking. As a result of the stabilization differences, the stabilized display image sequence does not exactly match the stabilized archival image sequence. For example, the stabilized display image sequence might provide some jerkiness at the beginning of panning relative to the stabilized archival image sequence. Although this difference might be uncomfortable for some users, such as professional camera operators and skilled amateurs, it is expected that most users will not mind the difference.

Each of the images in the stabilized display image sequence is discarded following its display, unless there is a possibility that display would be repeated. Repeated display of the stabilized display image sequence is only desirable if the stabilized archival image sequence is unavailable. This is unlikely unless the archival image sequence stabilization is very slow or the stabilized archival image sequence is unavailable due to logistical constraints. After the stabilized display image sequence has been shown (and most likely discarded), the archival image becomes available for display or other use. Discarding can include erasure of file contents, but, as with ordinary computer systems, can be limited to a change in a filename or the like, that permits overwriting by new data.

In a camera, stabilization of both image sequences can start at the same time. Image frames of the archival image sequence can be buffered based on available memory. Alternatively, the image frames of the archival image sequence can all be stored in memory and the stabilization of the archival image sequence can be delayed until more computational resources are available. For example, archival image sequence stabilization can be delayed until some or all stabilized display image sequence images have been displayed or have been displayed and discarded. In any case, it is highly preferred that stabilization of the archival image sequence follows the stabilization of the display image sequence automatically. Otherwise, there is a risk that the stabilization of the archival image sequence would be missed and the resulting final archival image sequence would not meet user expectations.

Image frames are stabilized by moving an output window relative to a captured oversized image. On each of the stabilization paths, cropping can be irreversible, since the cropped image portions are not reused on that path. This reduces storage requirements, on each path, relative to the size of a copy of the original oversized image sequence. Image frames on the display path can also be subsampled to the resolution required for an intended display. This further reduces storage requirements. If image frames are subsampled prior to stabilization, processing requirements for stabilization are also reduced.

Figure 2:
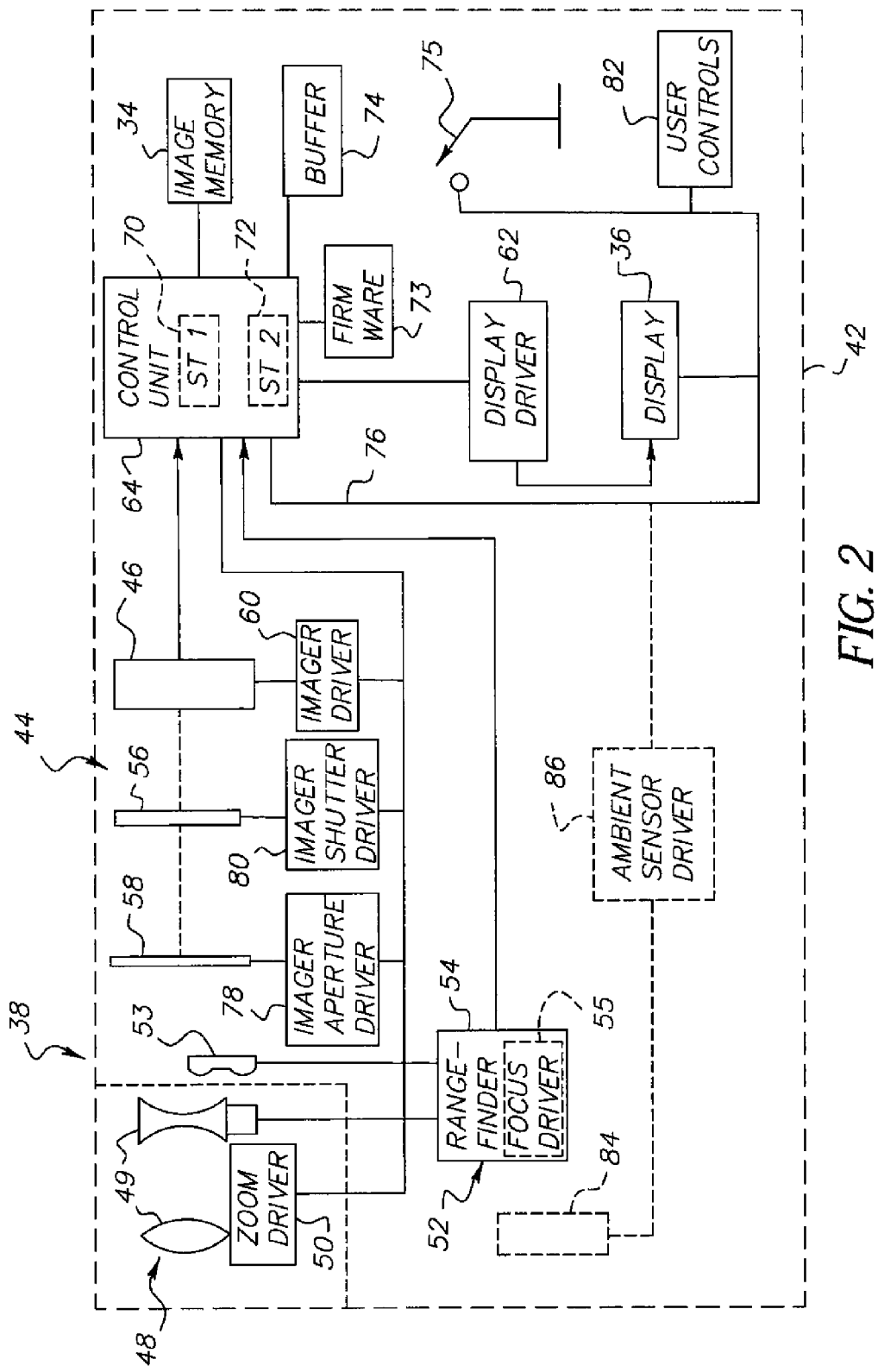
FIG. 2 is a diagrammatical view of an embodiment of a camera, which provides the dual path stabilization of FIG. 1.

FIG. 2 illustrates an embodiment of the digital camera 38. The camera 38 has a body 42 that holds an electronic capture unit 44. The body 42 provides structural support and protection for other components. The body 42 of the camera 38 can be varied to meet requirements of a particular use and style considerations. The electronic image capture unit 44 has an electronic array imager 46 that is mounted in the body 42. The camera 38 has a taking lens unit 48 of one or more lens elements 49 mounted in the body 38. The taking lens unit 48 is illustrated by a dashed line and two groups of lens elements 49. It will be understood that this is illustrative, not limiting.

Referring again to the embodiment shown in FIG. 2, the taking lens unit 48 is a motorized zoom lens in which a mobile element or elements are driven, relative to a stationary element or elements, by a zoom driver 50. The taking lens unit 48 of the embodiment of FIG. 2 is also autofocusing. An autofocusing system 52 has a sensor 53 that sends a signal to a ranger 54, which then operates a focus driver 55 to move one or more focusable elements (not separately illustrated) of the taking lens unit 48. The autofocus can be passive, active, or a combination of the two. The taking lens unit 48 can be also be simple, such as having a single focal length and manual focusing or a fixed focus. Digital zooming (enlargement of a digital image equivalent to optical zooming) can also be used instead of or in combination with optical zooming.

A shutter 56 shutters the light path to the imager 46. A diaphragm/aperture plate 58 or the like can also be provided in the light path. The shutter 56 is switchable between an open state and a closed state. The term "shutter" is used in a broad sense to refer to physical and/or logical elements that provide the function of allowing the passage of light along a light path to a filmstrip or imager for image capture and disallowing that passage at other times. "Shutter" is inclusive of computer software and hardware features of electronic array imagers that allow an imaging operation to be started and stopped.

The imager 46 receives a light image (the subject image) and converts the light image to an analog electrical signal, an electronic image, which is one frame of an image sequence. The electronic imager 46 is operated by the imager driver 60. After replication and processing, the electronic image is ultimately transmitted to the image display 36, which is operated by an image display driver 62, and is also sent to memory 34.

Figure 3:
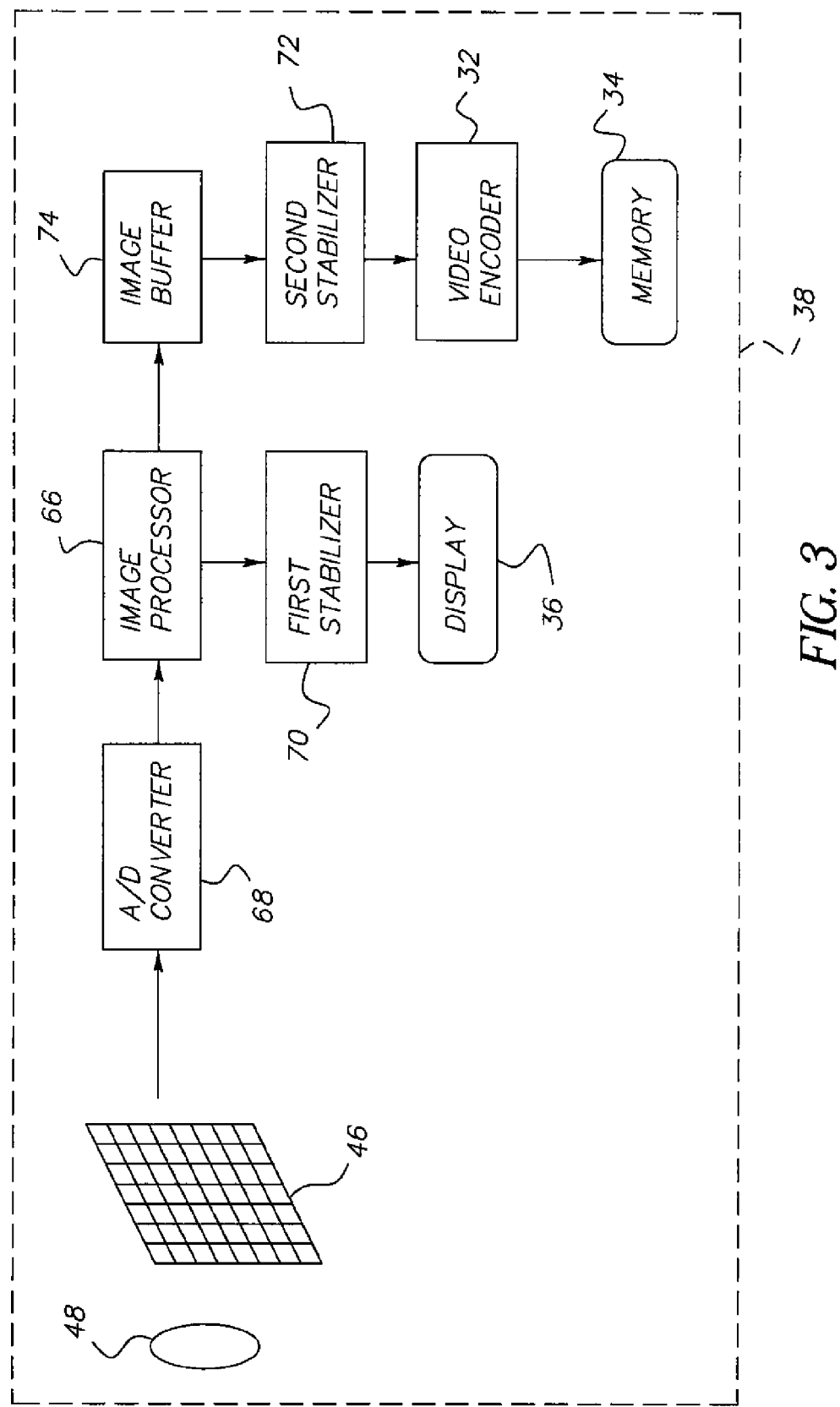
FIG. 3 is a diagrammatical view illustrating the operation of the camera of FIG. 2.
Figure 4:
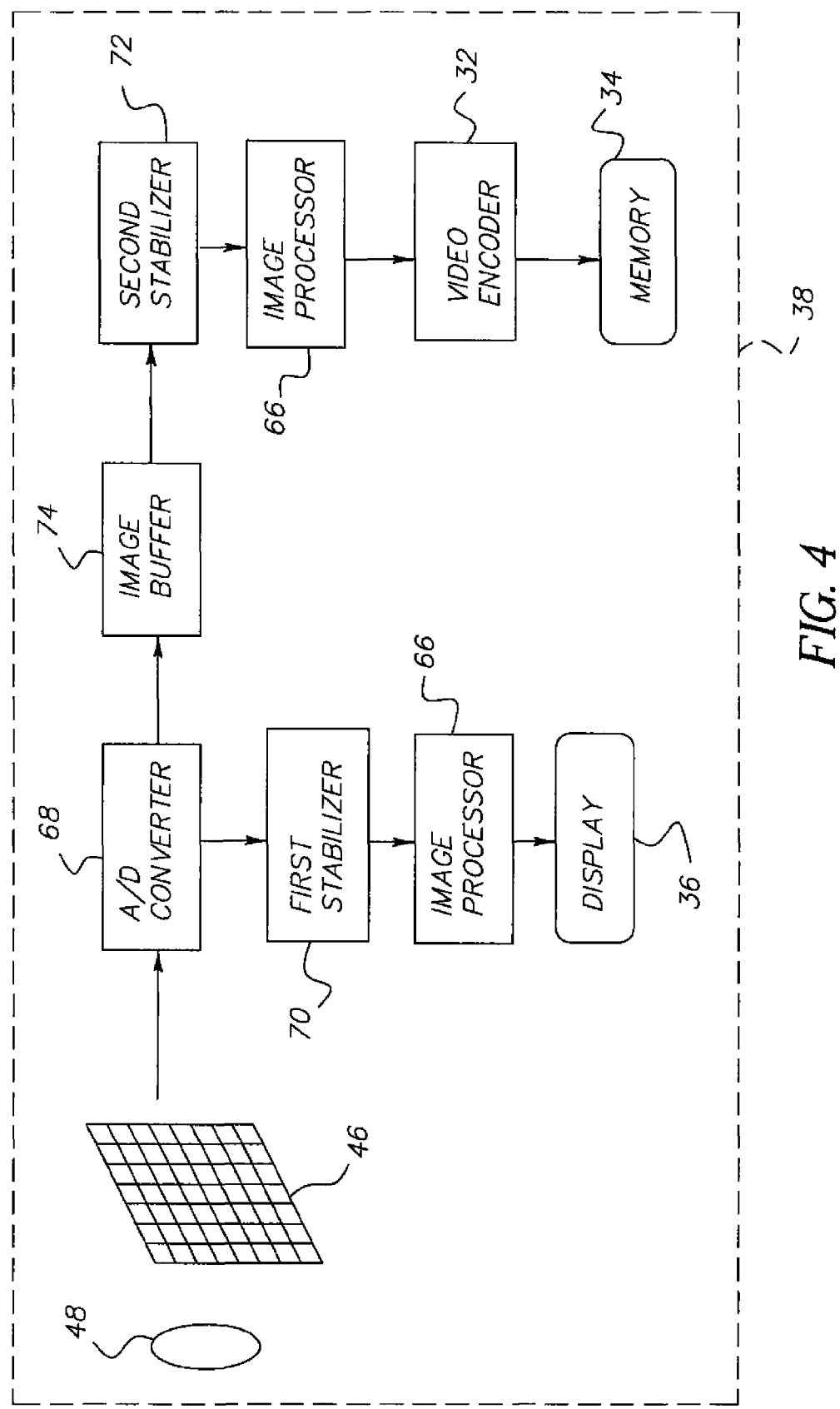
FIG. 4 is the same view as FIG. 3, but illustrates a modified camera.

Referring now to FIGS. 2-4, the camera 38 has a control unit 64 that includes an image processor/controller 66 in the form of an appropriately configured microcomputer, such as an embedded microprocessor having RAM for data manipulation and general program execution. The control unit 64 controls other components of the camera and performs image processing functions. The control unit 64 shown in FIG. 2 includes the controller 66, an analog to digital (A/D) converter 68, a video encoder 32, a replicator (not shown), and first and second stabilizers 70,72. The control unit 64 is operatively connected to buffer memory 74. Suitable hardware and software for the control unit and other components are known to those of skill in the art and can be modified to provide the features discussed herein. The control unit can be provided as a single component or as multiple components of equivalent function in distributed locations. The same considerations apply to the processor and other components. Likewise, components illustrated as separate units herein may be conveniently combined or shared in some embodiments.

The control unit also provides digital processing that calibrates the verification image to the display. The calibrating can include conversion of the electronic image to accommodate differences in characteristics of the different components. For example, a transform can be provided that modifies each image to accommodate the different capabilities in terms of gray scale, color gamut, and white point of the display and imager and other components of the electronic capture unit. The calibration relates to component characteristics and thus is invariant from image to image. The electronic images can also be modified in the same manner as in other digital cameras to enhance images, such as edge enhancement. Calibration and other image processing can occur before or after replication, and can differ on the two paths. For example, processing and calibration can be limited both in accuracy and the functions provided to reduce processing time on the display path; while more accurate and complete calibration and processing can be provided on the archival path. Digital processing on the archival path can also include modifications related to file transfer, such as, JPEG compression, and file formatting.

The control unit is operatively connected to memory. "Memory" refers to one or more suitably sized logical units of physical memory provided in semiconductor memory or magnetic memory, or the like. For example, the memory can be an internal memory, such as a Flash EPROM memory, or alternately a removable memory, such as a Compact Flash card, or a combination of both in any form. The control unit 64 can be controlled by software stored in the same physical memory that is used for image storage or, as shown in FIG. 2, separate memory can be provided for image storage and a buffer, and firmware can be stored in dedicated memory 73, for example, in a ROM or EPROM firmware memory.

Various types of image display 36 can be used. For example, the display can be a liquid crystal display ("LCD") or an organic electroluminescent display ("OELD"; also referred to as an organic light emitting display, "OLED"). The image display 36 can be operated on demand by actuation of the camera trigger 75 for image capture or by a switch (not separately illustrated) and the image display 36 can be turned off by a timer or by release of the camera trigger 75. The display 36 is mounted on the back or top of the body 42 or is internal to the viewfinder (not shown), to be readily viewable by the photographer during picture taking. One or more information displays (not shown) can also be provided on the body, to present camera information to the photographer or this information can be provided on the image display, for example, as a superimposition on the image.

It is preferred that the imager captures and the image display shows substantially the same geometric extent of the stabilized image frames as is provided by the archival image sequence. For this reason it is preferred that the display show from 85-100 percent of a stabilized image frame, or more preferably from 95-100 percent of a stabilized image frame.

The initial electronic image is amplified and converted by the analog to digital (A/D) converter-amplifier 68 to a digital electronic image, which is then replicated, processed in the image processor 66, and displayed and stored in the image memory 34. Signal lines, illustrated by a data bus 76, electronically connect the imager 46, control unit 64, display 36, and other electronic components. The control unit 64 includes a timing generator (not shown) that supplies control signals for all electronic components in timing relationship. Calibration values for the individual camera are stored in a calibration memory (not shown), such as an EEPROM, and supplied to the control unit. The controller operates the drivers and memories, including the zoom driver 50, focus driver 55, aperture driver 78, and shutter driver 80. The camera 38 is operated by means of the trigger 75 and other user controls 82. An ambient sensor 84 and ambient sensor driver 86 (indicated by dashed lines) can be provided as a separate component or as a part of the capture unit 44, for use in determining exposure conditions.

It will be understood that the circuits shown and described can be modified in a variety of ways well known to those of skill in the art. It will also be understood that the various features described here in terms of physical circuits can be alternatively provided as firmware or software functions or a combination of the two. Likewise, components illustrated as separate units herein may be conveniently combined or shared in some embodiments.

The imager includes a two-dimensional array of photosites corresponding to picture elements of the image, which together capture an image. A color filter array is positioned over the photosites, such that the electronic image capture unit captures a multi-colored image. It is currently preferred that a single imager is used along with a three-color filter, however, differently color filter arrays can be used, as can multiple monochromatic imagers each with a different one-color filter. Suitable color filter arrays are well known to those of skill in the art. Color filter arrays, in some cases, are incorporated with the imager to provide an integral component.

Now referring to a particular embodiment, linear red, green, and blue (RGB) image data is acquired from the imager. The data can be a complete RGB image, or it can be red, green, and blue planes of image data from a Bayer pattern color filter array. As is described in commonly-assigned U.S. Pat. No. 3,971,065, with a Bayer geometry color filter array, each color covers a photosite, or picture element (pixel), of the imager.

The image sensor is exposed to image light so that analog image charge information is generated in respective photosites. The charge information is applied to an output diode, which converts the charge information to analog image signals corresponding to respective picture elements. The analog image signals are applied to an A/D converter, which generates a digital image signal from the analog image signal for each picture element.

The digital image signal is replicated. Before or after replication, the digital image signal is input to the processor, which can apply appropriate image processing algorithms such as white balance, interpolation, color correction, self-focusing, and correction of sensor defects. Image stabilization is provided and output image sequences are sent to both the display and memory. The latter can first be sent to a video encoder for encoding using, for example, the MPEG or H.263 compression standard. The encoded video stream is then stored in memory.

Stabilization method can be performed using image data from one more channels of an image. It is preferred that the image data used for stabilization include information from all color channels. In particular embodiments, images are stabilized based upon a combination of all of said color channels or upon luminance values.

Image stabilization is provided by first stabilizer that acts on the display image sequence and a second stabilizer that acts on the archival image sequence. A sequence of images captured using an oversized imager and then replicated are cropped to a desired size for the two different output image sequences. In both cases, an output window defines the area to be cropped. The output window is moved to compensate for jitter, within the limits of the original images captured by the oversized imager. The first stabilizer determines the undesirable camera motion existing in the current frame and generates as output a stabilized image, which is sent to the display. Images of the archival image sequence are first sent to the image buffer. The second stabilizer determines the undesirable camera motion existing in a buffered frame, and this buffered image is encoded by the video encoder and finally stored in memory.

The captured image can be converted to a different color space and then be stabilized. For example, FIG. 3 shows an embodiment, in which stabilization, using the first and second stabilizers, is performed after conversion of color filter array (CFA) data captured by the imager, to $YC_bC_r$ or RGB colorspace. The stabilizers can operate on the multi-colored image data or one or both stabilizers can operate on the Y component or G component, respectively, of the image data.

The captured image can be stabilized immediately. The stabilization can work with color filter array (CFA) data captured by the imager or one or more components of that CFA data. For example, FIG. 4 shows an embodiment, in which stabilization, using the first and second stabilizers, is performed on color filter array (CFA) data captured by the imager. An example of color filter array data is data from a well-known Bayer pattern array, which is described in U.S. Pat. No. 3,971,065. Use of CFA data reduces processing requirements, since the output image sequence, which is later converted to a different color space, is smaller than the input image sequence. In Bayer pattern CFA data, each pixel location contains data for one color channel: red, green, or blue. The stabilizers can operate on the multi-colored image data or one or both stabilizers can operate on the green component of the image data.

Both stabilizers can operate on the same image data, CFA or converted color space, or one of the stabilizers can operate on CFA data and the other on image data converted to a different color space.

The stabilized image data is sent both to a display, such as a liquid crystal display, on the back of the camera, as well as to a video encoder, which produces an encoded video stream, using for example the MPEG or H.263 compression standard, and stores it in memory.

Figure 5:
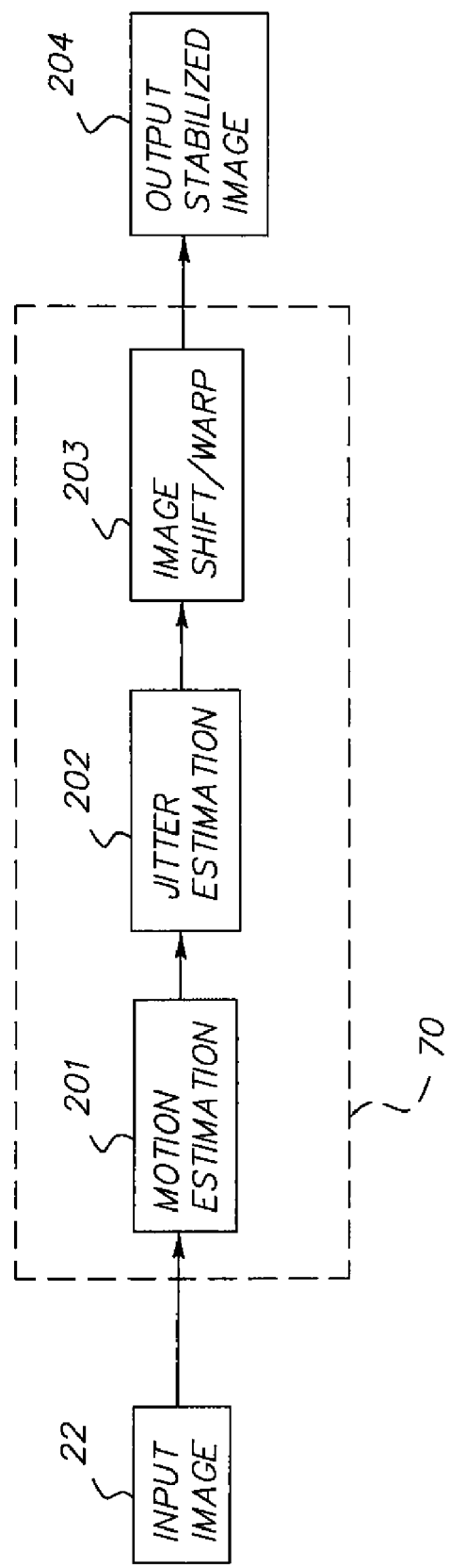
FIG. 5 is a diagrammatical view illustrating the operation of one of the stabilizers of the camera of FIG. 2.

In FIG. 5, an embodiment of the first stabilizer 70 is shown. The second stabilizer 72 can have the same features. Referring to FIGS. 1 and 5, the first stabilizer 70 has a motion estimation unit 201, which computes the motion between two display images 22 of the display image sequence 18.

In a particular embodiment discussed in detail herein, the motion is computed between successive images in the sequence. Those skilled in the art will recognize, however, that given sufficient computational and memory resources, motion estimates captured across multiple frames can be combined, in a like manner, to increase the robustness and precision of individual frame-to-frame motion estimates. In a particular embodiment, the motion estimation unit provides a single global translational motion estimate, comprising a horizontal component and a vertical component.

Referring again to FIGS. 1 and 5, the motion estimates are then processed by the jitter estimation unit 202 to determine the component of the motion attributable to jitter. Note that in general the estimated motion comprises both intentional motion, such as a camera pan, and unintentional motion due to camera jitter.

After the jitter has been calculated, the image shift/warp unit 203 identifies the sensor image data (output window) that is to be used to provide an output image 204 of the stabilized display image sequence 30. In a preferred embodiment, the motion is estimated as a global translational value, and the jitter is computed as a single global translational horizontal and vertical offset. Those who are skilled in the art will recognize that given sufficient computational resources, more complicated motion models that estimate rotation or general affine transforms that can be used, allowing for subsequent more general image warping to correct for the unintentional jitter.

Figure 6:
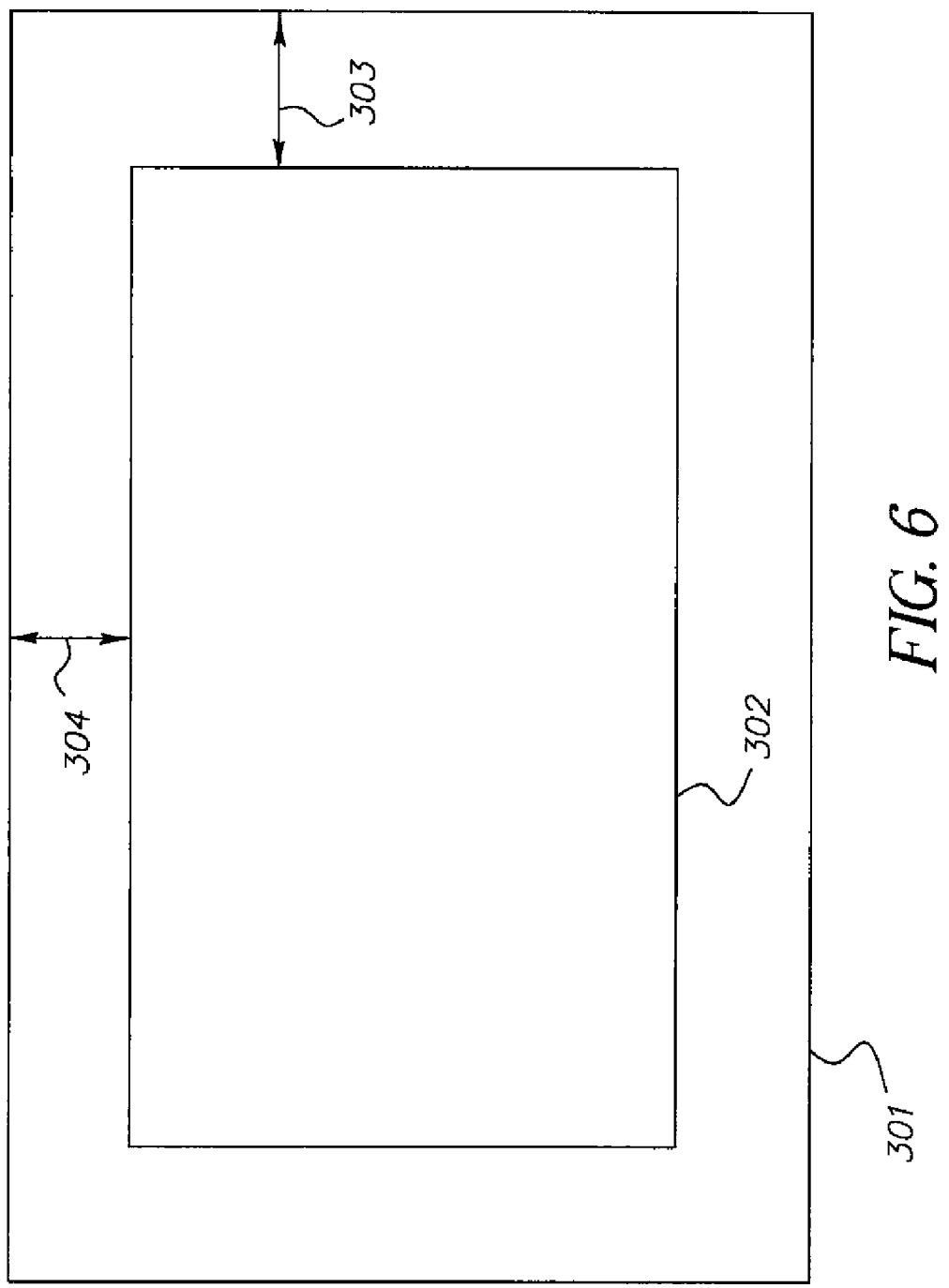
FIG. 6 is a diagrammatical view showing the output window positioned on the original image captured by an oversized imager of the camera of FIG. 2. The output window is an unadjusted position.
Figure 7:
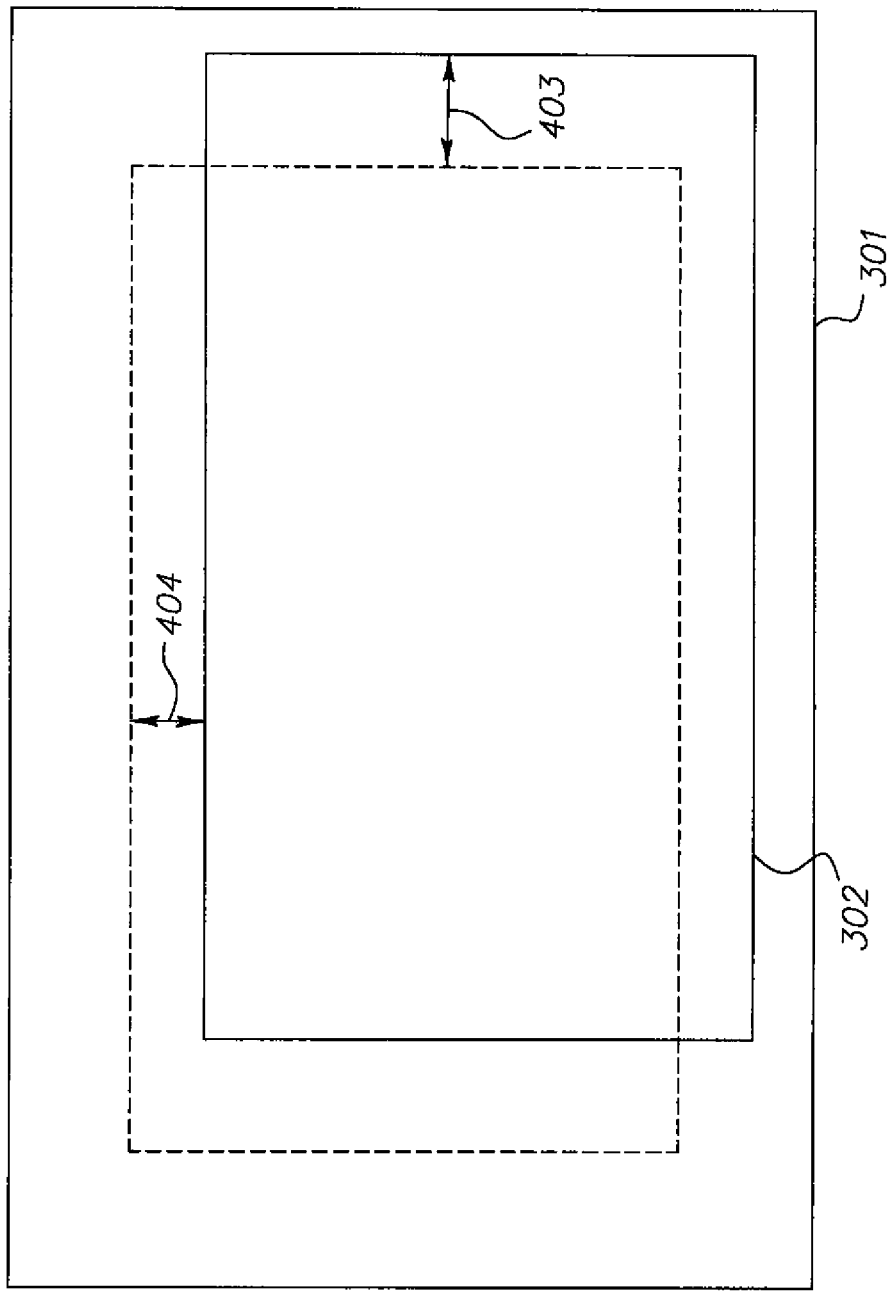
FIG. 7 is the same view as FIG. 6, but the output window is in a shifted position to compensate for jitter.
Figure 8:
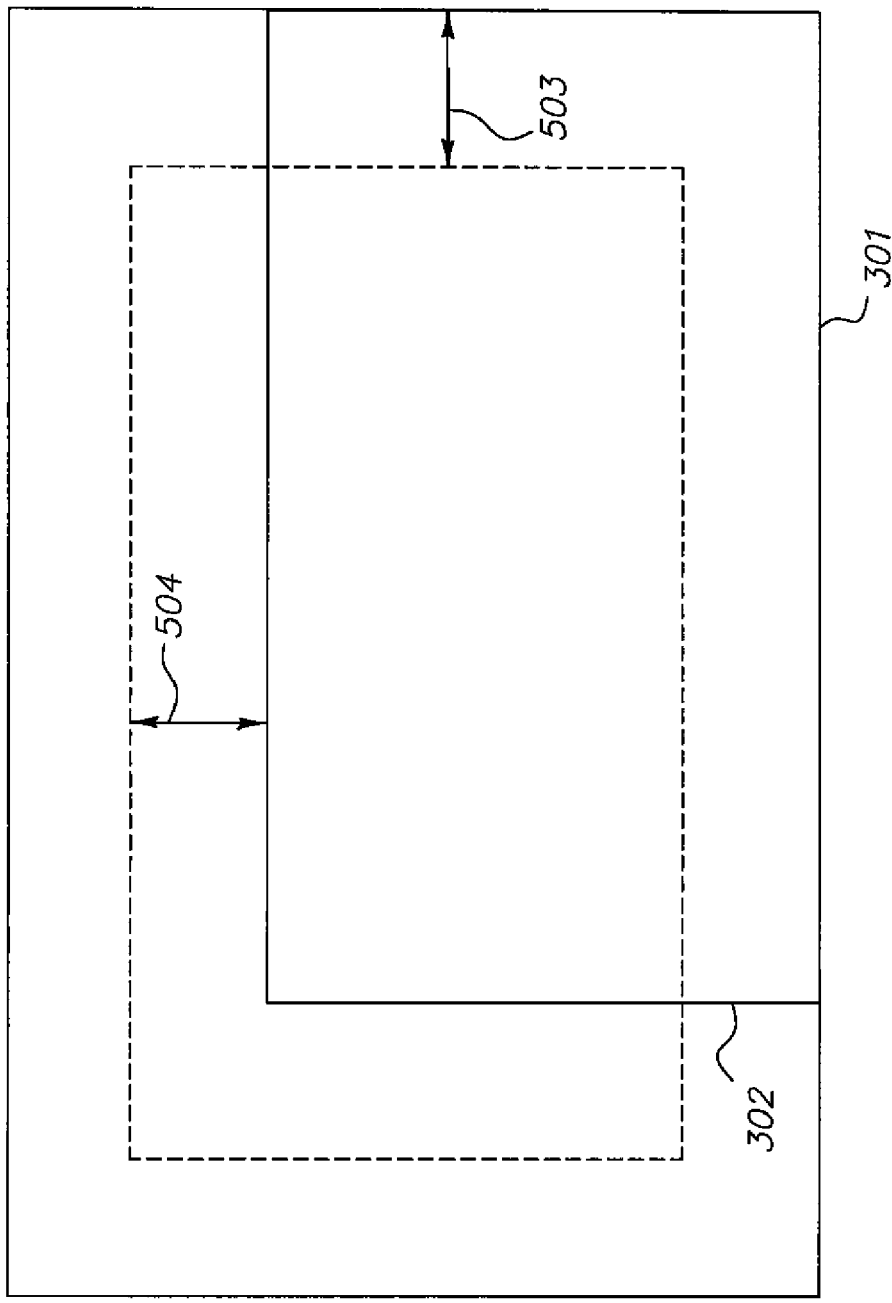
FIG. 8 is the same view as FIGS. 6-7, but the output window is maximally shifted both to the right and downward to another shifted position that is representative of a maximum available jitter correction in those directions.

In a particular embodiment, the image shift/warp unit 203 adjusts the accumulated jitter values to integer values, by rounding or truncation, for example. Integer valued offsets are easily compensated for given the oversized sensor data. Non-integer offsets require interpolation and additional computational resources. FIGS. 6-8 illustrate the general behavior of the stabilizer 70 for global translational jitter offsets. The sensor data (the original digital image 301 contains more pixels than are required for the final resolution of the video.

Referring to FIG. 6, prior to any stabilization, the output window 302 is centered, such that a centrally located interior region of the sensor data is provided as the image data to be used in the output image sequence. During stabilization, the output window 302 is shifting right-left and up-down, within the boundaries of the available image data. The maximum possible offsets in upward and rightward directions are shown by arrows 304 and 303, respectively. FIG. 7 shows the position of the output window 302 following a downward, vertical offset 404 and a rightward, horizontal offset 403. FIG. 8 illustrates a boundary case, in which the maximum possible jitter correction has been utilized. In this case, the downward, vertical offset 564 and rightward, horizontal offset 503 are at maximum and further jitter correction is not possible using the available image data. It is preferred that, accumulated horizontal and vertical jitter terms are clipped at maximum possible values, to prevent a request for image data outside of the available sensor data.

In the motion estimation, two or more images are analyzed to determine the jitter. For convenience, the following discussion is generally directed to two successive images in a sequence. It will be understood that like considerations apply to analysis of subsequent pairs of images, images in groups of three or larger, and non-successive images.

The relative jitter between two images can be complex and a complete correction of that jitter might require one or more image transformations including rotation, warping, and general affine transformations. The methods here are directed to situations of limited computational resources. It has been determined that a simplified motion estimation is beneficial in removing much of the jitter due to photographer unsteadiness. That simplified motion estimation has one global motion vector, containing a horizontal and a vertical component.

In particular embodiments of the invention, the output window is adjusted so as to remain fully within boundaries of a respective input image. In other words, output images are retained fully within the field of view of the respective input images. This avoids the situation of a partial image appearing in an output window due to the limited field of view of the input window. Additional information from earlier frames or the like could be used to supplement an image, for example, as disclosed in U.S. Pat. No. 5,289,274, but such an approach is undesirable due to the added complexity and the time required for processing such information.

The output window can be stopped only when a boundary is reached or the jitter correction can be adjusted to damp out movement of the output window toward a boundary. The former case can be provided as a bound on the maximum magnitude of the accumulated jitter. This serves two purposes: first, physical constraints corresponding to limits of the field of view are imposed; and second, bounding the accumulated jitter prevents the jitter-corrected video from falling too far behind during an intentional pan, due to phase-delay misclassification of motion as jitter.

A bound can also or instead be placed on the maximum jitter correction for a single frame, relative to the previous frame. Given known physical properties of human hand shake amplitude as well as camera characteristics, a maximum expected jitter amplitude (in pixels) can be computed. This constraint can improve robustness by preventing excessive jitter correction for an individual frame.

Integral projections can fail as a motion estimation technique under various conditions. For several conditions, some failure can be mitigated by comparing jitter corrections or components to a threshold that was predetermined heuristically.

One such condition is when the scene contains a repeated pattern, such that multiple different motion estimates yield similar costs. This case can be identified by ascertaining not only the best motion estimate, but also the second and third best motion estimates. Under normal circumstances, these three best motion estimates will be clustered together. If the difference between them is greater than a predetermined threshold, then a repeated pattern may be present. In that case, the respective jitter components can be zeroed out.

Another condition when integral projection-based motion estimation may fail is when the scene has very little contrast or content. In this case, all motion estimates have similar accuracy, and the best offset may be determined incorrectly due to noise. This case can be identified by tracking the average cost of all motion estimates, as well as tracking the best cost. If the ratio between the average cost and the best cost is too small, that suggests a scene with little content and the respective jitter components are zeroed out.

Another situation that may result in motion estimation failure is the introduction from one image to the next of an independently moving object. In this case, there may not be any motion offsets that yield low costs. This case can be identified by comparing the cost of the best motion estimate to a threshold value. If the threshold is exceeded, then the jitter components are zeroed out.

Another situation that may result in integral projection failure is illumination change from one frame to the next. This situation can be addressed by summing the values in the integral projection vectors to obtain an overall intensity value for each vector. These values can be used to normalize the projection vectors prior to evaluating the various motion estimate offsets.

In embodiments in which computational resources are constrained, the jitter correction term is rounded to the nearest integer to avoid the need for interpolation. For YCbCr data in which the chrominance components are sub-sampled by a factor of two in the horizontal direction, it may also be necessary to round the jitter correction to the nearest multiple of two so that the chrominance data aligns properly. Rounded can be provided in different ways. One solution is simply to use the rounded value of accumulated jitter (A[n]) as the offset for each frame. This approach is simple, but can exacerbate the jitter between consecutive frames. A more preferred approach that avoids the problem above, is computing the individual jitter for each frame relative to the previous frame, and then rounding this value. Wander of the resulting values about a zero-mean can be reduced by forcing individual rounding operations in a direction that reduces quantization error.

Display Image Stabilization

Referring now to FIGS. 1, 3, and 5-8 images 22 on the display path are received by the first stabilizer 70. The input images 22 are analyzed to determining jitter. (Analysis of input images can be provided once for both paths, if desired.) An output window 302 is mapped onto the input images based on the determined jitter. The mapping at least partially compensates for the jitter. The input images are cropped to the output window to provide corresponding output images. The cropping occurs concurrent with capture of the image sequence and the output images are preferably displayed to the photographer. The cropping can replace the input images in memory with the corresponding output images or can retain both input images and output images in memory. With typical memory storage, the image information is stored in a buffer that is arranged in raster scan fashion. The method moves this data in an integer shift of the data horizontally and vertically. This shift introduces no distortions in the image data and can be done very quickly.

The stabilization method of the first stabilizer allows fast digital stabilization of image sequences using moderate processing resources, which makes them particularly suitable for stabilization of image sequences in cameras. The method is applicable to real time use during capture. In that case, the method is rearward-looking, that is only past and current image frames are used in the image stabilization. The method can also be used for processing after image sequence capture. In that case, the method is both rearward-looking and forward-looking, that is past, current, and future image frames are used in the image stabilization.

Stabilization at the time of capture is advantageous for several reasons. Stabilized output image sequences provided in a viewfinder or camera display provide better feedback to the photographer. Stabilized output image sequences are easier to store. In digital stabilization, an oversized electronic imager is typically used for image capture. The term "oversized" refers to an imager that captures input images having a larger field of view than is presented in output images. The extra pixels are used in stabilization or discarded when the output images are produced. The output images are smaller to store than the input images. Stabilization at the time of capture allows storage of output images rather than input images. An additional advantage of stabilization at the time of capture is that the stabilization uses an image sequence that has not previously been subject to one or more compression/decompression cycles. Such cycles can cause artifacts during later digital stabilization.

In the stabilization, the movement of the output window is based upon a comparison of composite projection vectors of the motion between the two different images in two orthogonal directions. The first stabilizer has a motion estimation unit, which computes the motion between two images of the sequence. The composite projection vectors of each image are combinations of non-overlapping partial projection vectors of that image in a respective direction. In a particular embodiment, the motion is computed only between successive images in the sequence. Those skilled in the art will recognize, however, that given sufficient computational and memory resources, motion estimates captured across multiple frames can also be computed to increase the robustness and precision of individual frame-to-frame motion estimates.

In the particular embodiment, the motion estimation unit provides a single global translational motion estimate, comprising a horizontal component and a vertical component. The motion estimates are then processed by the jitter estimation unit to determine the component of the motion attributable to jitter. The estimated motion can be limited to unintentional motion due to camera jitter or can comprise both intentional motion, such as a camera pan, and unintentional motion due to camera jitter.

In a particular embodiment, integral projection vectors are used in the production of the global motion vector. Full frame integral projections operate by projecting a two-dimensional image onto two one-dimensional vectors in two orthogonal directions. These two directions are aligned with repeating units in the array of pixels of the input images. This typically corresponds to the array of pixels in the electronic imager. For convenience herein, discussion is generally limited to embodiments having repeating units in a rectangular array the two directions are generally referred to as "horizontal" and "vertical". It will be understood that these terms are relative to each other and do not necessarily correspond to major dimensions of the images and the imager.

Horizontal and vertical full frame integral projection vectors are formed by summing the image elements in each column to form the horizontal projection vector, and summing the elements in each row to form the vertical projection vector. This concept and subsampling are illustrated in FIGS. 9-10.

Figure 9:
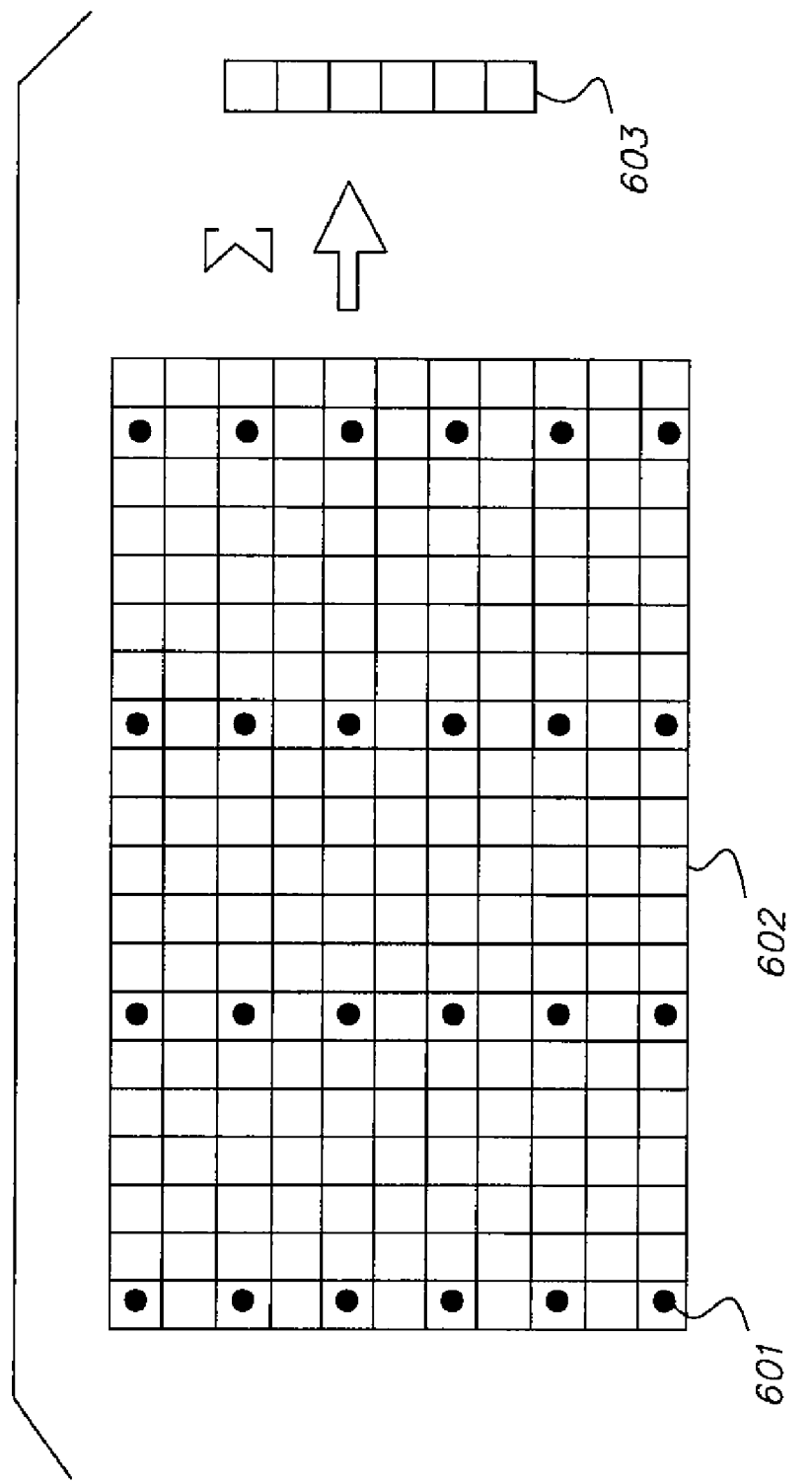
FIG. 9 is a diagrammatical view illustrating the image data used to form the vertical projection vector in digital stabilization provided by one of the stabilizers of the camera of FIG. 2.

In FIG. 9, the vertical projection vector 603 is formed by summing various data points 601 within the overall Y component image data 602. In a particular embodiment, only a subset of the image data is used when forming the vertical projection vector. Using only a subset of the image data allows for reduced computational complexity of the motion estimation algorithm. In FIG. 9, only every sixth pixel of each row of the image data is included in a row summation. Additionally, only every second row is considered in the summation.

Figure 10:
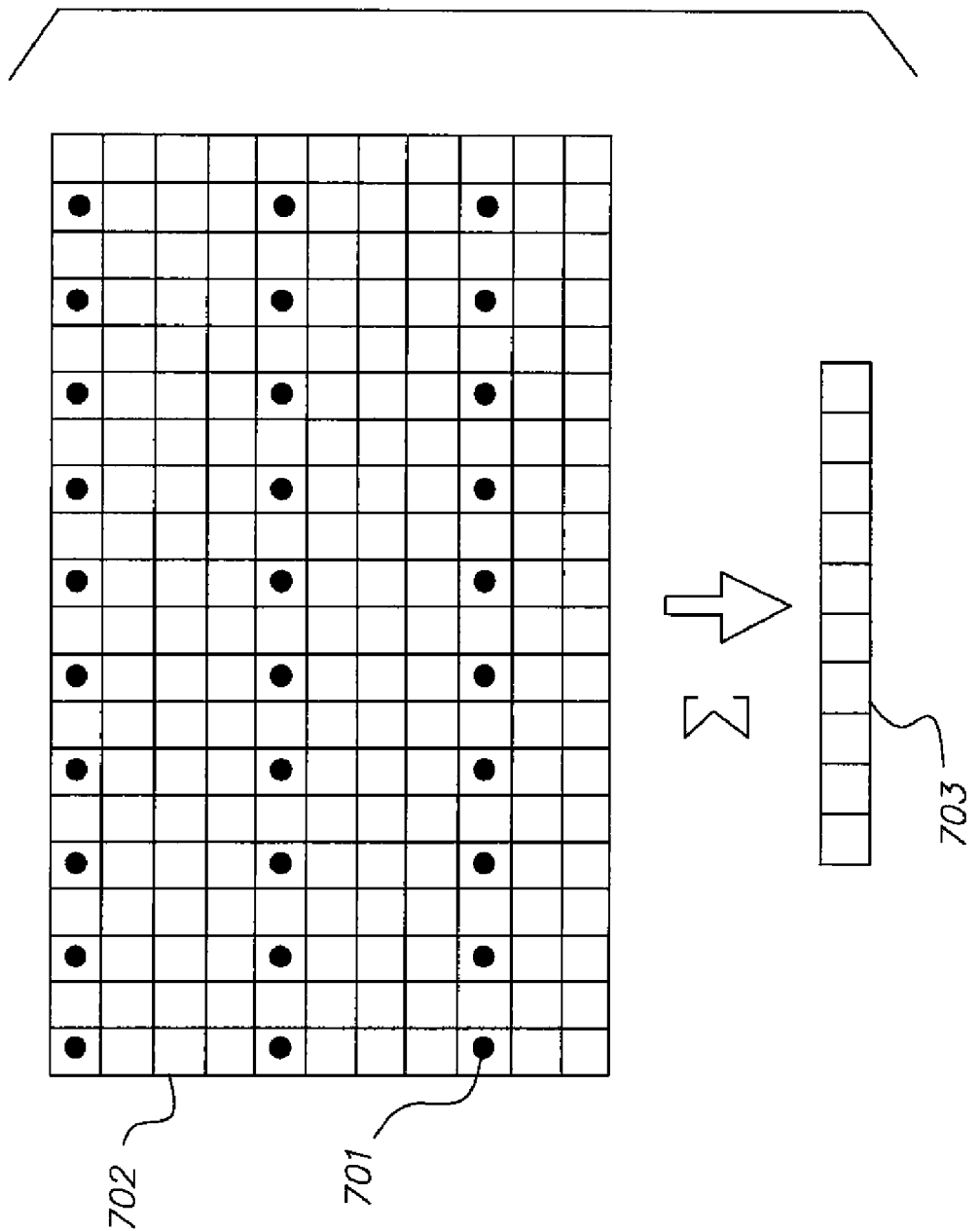
FIG. 10 is a diagrammatical view corresponding to FIG. 9, illustrating the image data used to form the horizontal projection vector.

Similarly, FIG. 10 illustrates the formation of the horizontal projection vector 703 as a summation of various data points 701 within the overall Y component image data 702. In a particular embodiment, only a subset of the image data is used when forming the horizontal projection vector. Using only a subset of the image data allows for reduced computational complexity of the motion estimation algorithm. In FIG. 7, only every fourth pixel of each column of the image data is included in a column summation. Additionally, only every second column is considered in the summation.

Much of the burden of estimating motion via integral projections resides in the initial computation of the projection vectors. If necessary, this complexity can be reduced in two ways. First, the number of elements contributing to each projection sum can be reduced by subsampling. For example, when summing down columns to form the horizontal projection vector, only every other element of a column is included in the sum. A second subsampling can be achieved by reducing the density of the projection vectors. For example, when forming the horizontal projection vector, including only every other column in the projection vector. This type of subsampling reduces complexity even more because it also decreases the complexity of the subsequent matching step to find the best offset, but it comes at a cost of reduced motion resolution.

The subset of imaging data to be used for the horizontal and vertical projection vectors can be selected heuristically, with the understanding that reducing the number of pixels reduces the computational burden, but also decreases accuracy. For accuracy, it is currently preferred that total subsampling reduce the number of samples by no more than a ratio of 4:1-6:1.

In the method, non-overlapping partial projection vectors are computed for each of the images. These are projection vectors that are limited to different portions of the image. The motion estimate is calculated from these partial projection vectors. The use of these partial projection vectors rather than full frame projection vectors reduces the effect of independently moving objects within images on the motion estimate.

It has been determined that the number of partial projection vectors in each direction need not be large for good results. For example, in a particular embodiment shown in FIG. 11, the partial projection vectors represent the four quarters of a full frame projection vector in the same direction.

Once the partial projection vectors have been computed for two frames, the horizontal and vertical motion estimates between the frames can be evaluated independently.

Figure 11:
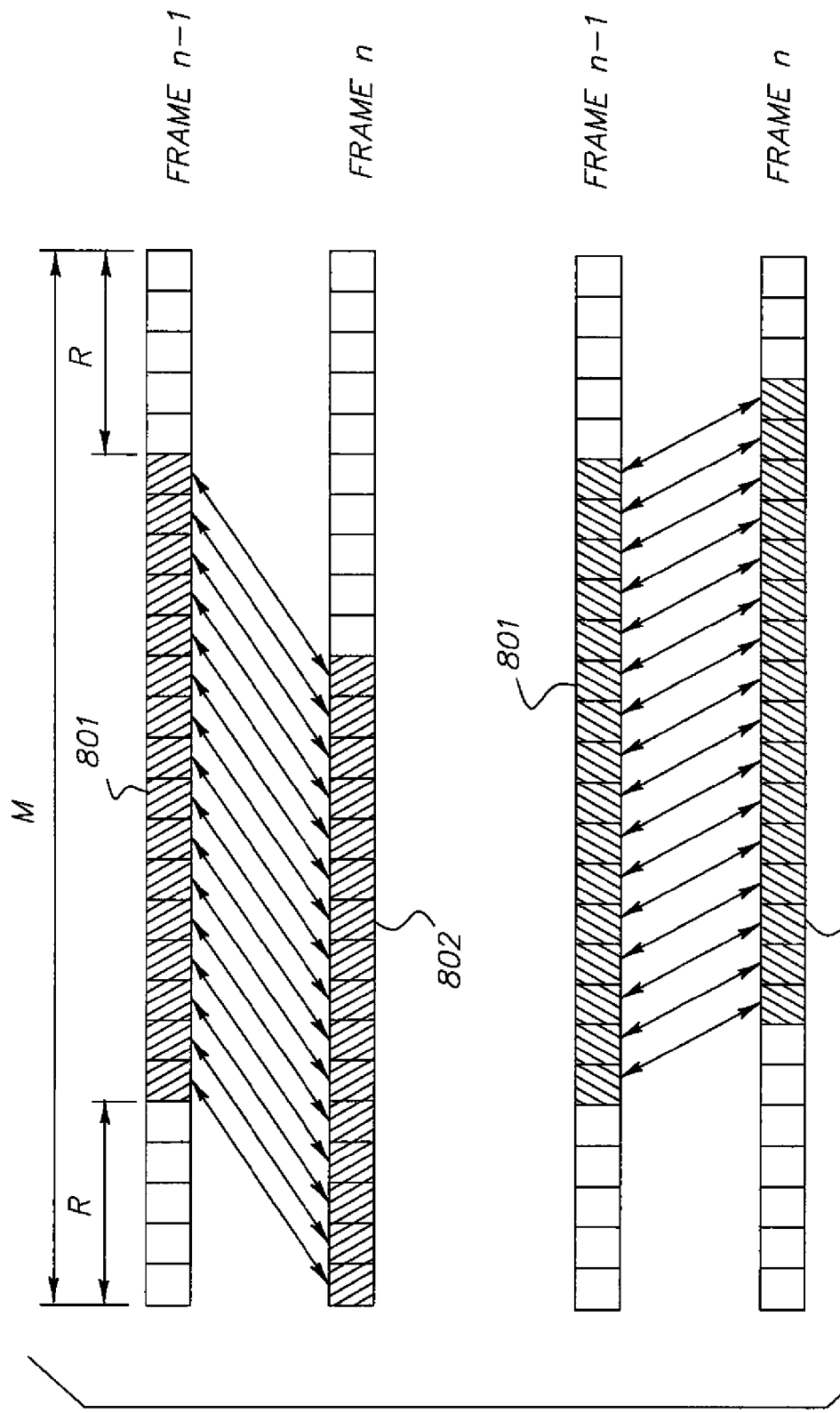
FIG. 11 is a diagrammatical view illustrating the image data used, in the stabilization of FIG. 9, to compute costs associated with different motion offsets.

FIG. 11 illustrates comparing the corresponding partial projection vectors between corresponding partial areas of two images. Given length M horizontal projection vectors, and a search range of R pixels, the partial vector 801 of length M-2R from the center of the projection vector for frame n−1 is compared to partial vectors from frame n at various offsets 802, 803. The comparison yielding the best match is chosen as a jitter component providing the motion estimate in the respective direction. The best match is defined as the offset yielding the minimum distance between the two vectors being compared. Common distance metrics include minimum mean absolute error (MAE) and minimum mean squared error (MSE). In a particular embodiment, the sum of absolute differences is used as the cost function to compare to partial vectors, and the comparison having lowest cost is the best match.

Figure 12:
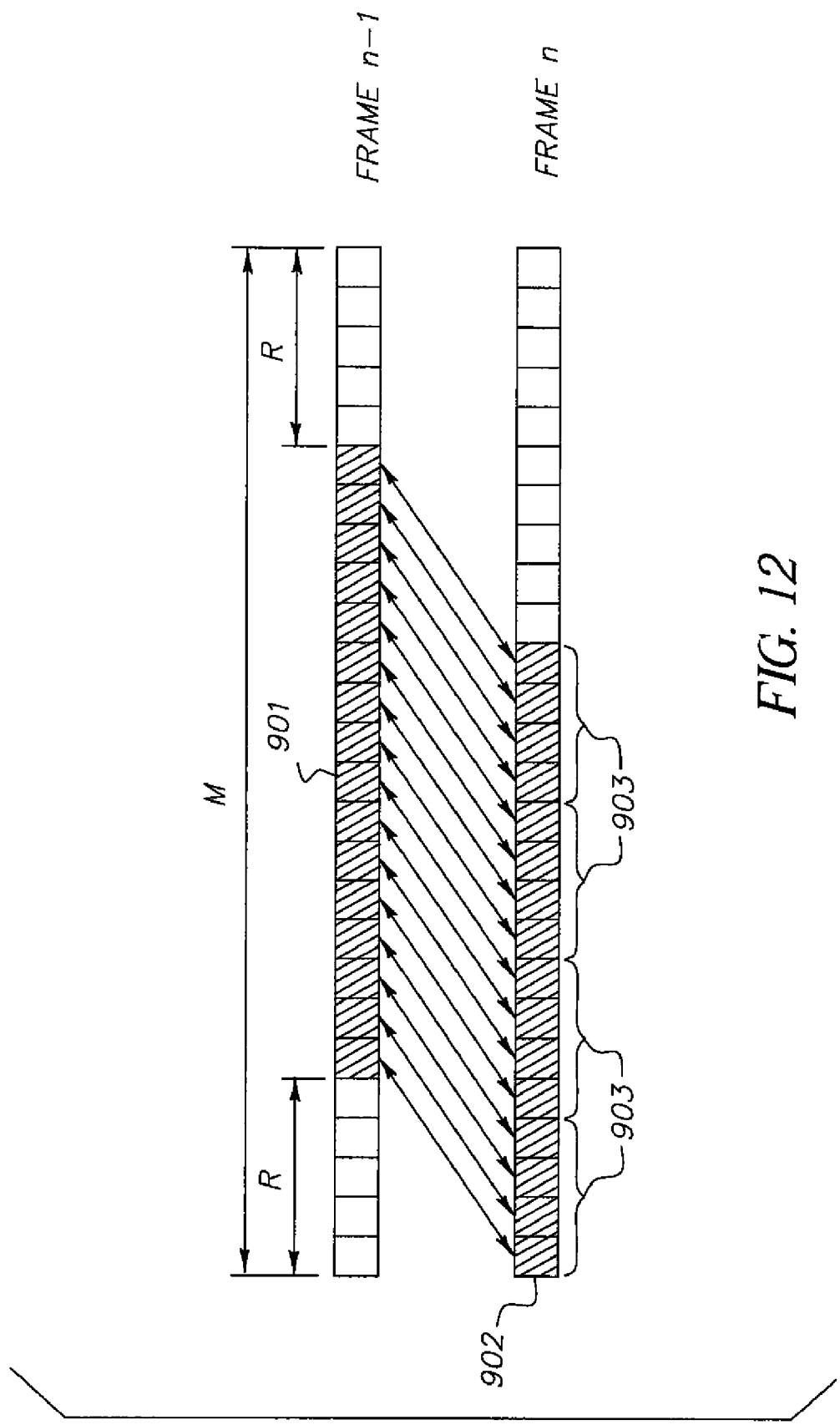
FIG. 12 is a diagrammatical view corresponding to FIG. 11, but using a modified stabilization method, in which image data used to compute costs associated with motion offset is divided into segments.

Referring to FIG. 12, the partial vector 901 of length M-2R from the center of the projection vector for frame n−1 is compared to a partial vector from frame n at an offset 902. The partial vectors are also divided into smaller partial vectors that divide the output window into sections. This is illustrated in FIG. 12 with the partial vector 902 divided into four quarter-sized partial vectors 903. Individual costs can be calculated for each partial vector 903 as well as for full frame vectors calculated separately or by combining respective partial frame vectors into composite vectors. If the differences (absolute value, or squared) from all four quarters are combined, the full frame integral projection distance measure is obtained. The final global motion estimate can be selected from among all the best estimates. This flexibility makes the integral projection motion estimation technique more robust to independently moving objects in a scene that may cause the overall image not to have a good match in the previous image, even though a smaller segment of the image may have a very good match.

In a particular embodiment, quarters are combined to yield distance measures for half-regions of the image:
  1st and 2nd quarters yield a distance measure for the left half of image,
  3rd and 4th quarters yield a distance measure for the right half of image,
  1st and 4th quarters yield a distance measure for an outer "half" (two separated portions equal in area to one-half of image), and
  2nd and 3rd quarters yield a distance measure for an inner half of image.

In addition to or instead of computing an offset for the best match over all four quarters, individual offsets can be computed for the best match for each of the half-regions as well. These additional offsets can increase the robustness of the motion estimation, for example, by selecting the median offset among the five possible, or by replacing the full-region offset with the best half-region offset if the full-region offset is deemed unreliable. This can be useful where there is a troublesome independently moving object, such as a fan's raised hand in a sequence showing a sports event. The fan's hand would confound a full-frame integral projection calculation, but is not present in measurements from the outer half-region.

Figure 13:
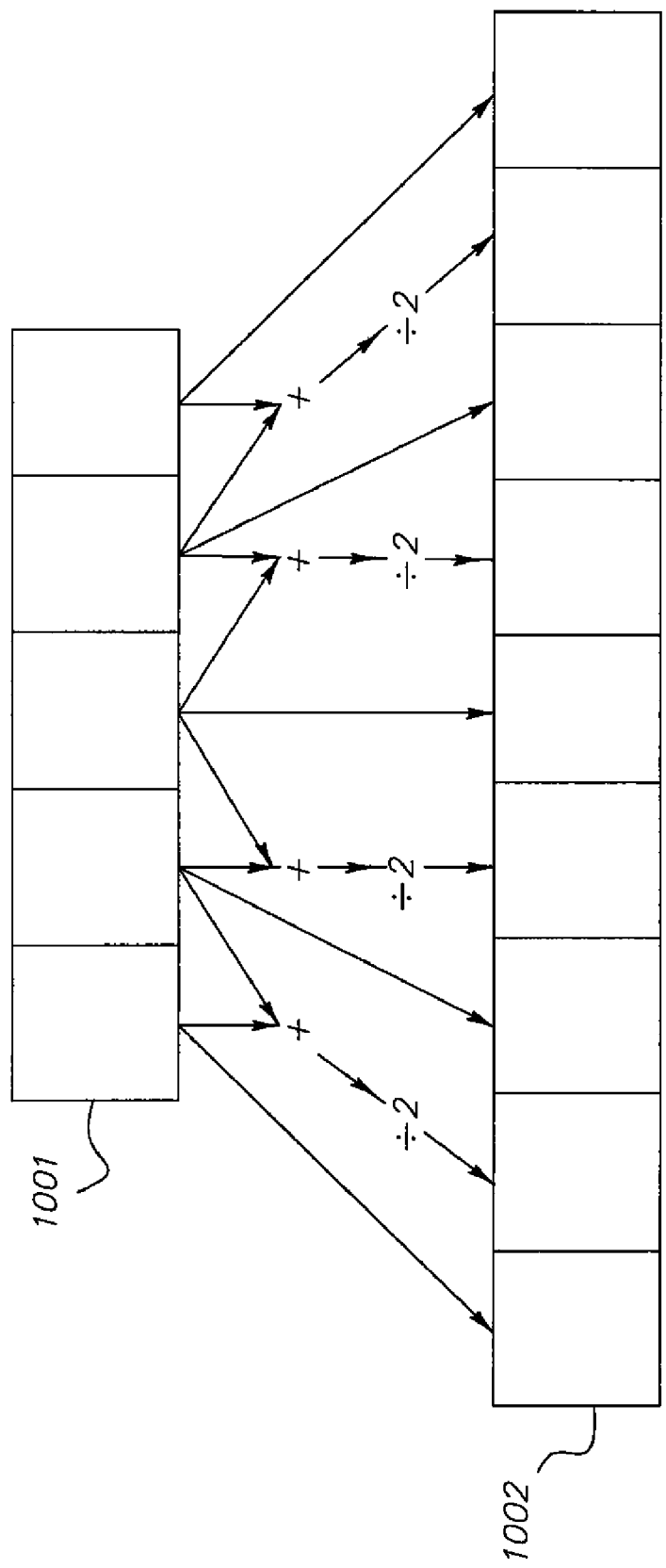
FIG. 13 is a diagram of the construction of an interpolated horizontal projection vector, in another modification of the stabilization method of FIG. 11.

Improved precision in the motion estimation process can be achieved by interpolation of the projection vectors. FIG. 13 illustrates the interpolation process. A projection vector 1001 of size n is interpolated to a vector of size 2n−1 (reference number: 1002) by replicating the existing elements at all even indices of the interpolated vector, and assigning values to elements at odd-valued indices equal to the average of the neighboring even-valued indices. This process can be achieved efficiently in hardware or software with add and shift operations.

Since the summation function used in integral projections is a linear function, interpolating the projection vector is equivalent to interpolating the original image data and then forming the projection vector. Interpolating the projection vector is significantly lower complexity, however.

In a particular embodiment, the interpolation provides half-pixel offsets. Since the projection operation is linear, the projection vectors can be interpolated, which is much more computationally efficient than interpolating an entire image and forming half-pixel projection vectors from the interpolated image data. Referring to FIG. 13, the vectors are interpolated by computing new values at the midpoints that are the average of the existing neighboring points. Division by 2 is easily implemented as a right shift by 1 bit. The resulting vector triplets are evaluated for best match.

The interpolated vectors can be constructed prior to any motion estimate offset comparisons, and the best offset is determined based on the lowest cost achieved using the interpolated vectors for comparison. Alternatively, the non-interpolated vectors from two images are compared first to determine a best coarse estimate of the motion. Subsequently, the interpolated vectors are only compared at offsets neighboring the best current estimate, to provide a refinement of the motion estimate accuracy.

Given the distances associated with the best offset and its two neighboring offsets, the continuous distance function can be modeled to derive a more precise estimate of the motion. The model chosen for the distance measurements depends on whether mean absolute error (MAE) or mean squared error (MSE) is used as the distance metric. If MSE is used as the distance metric, then the continuous distance function is modeled as a quadratic. A parabola can be fit to the three chosen offsets and their associated distances. If MAE is used as the distance metric, then the continuous distance function is modeled as a piecewise linear function.

Once a motion estimate has been computed, it is necessary to determine what component of the motion is desired, due to a camera pan, for example, and what component of the motion is due to camera jitter. In the simple case when the desired motion is known to be zero, all of the estimated motion can be classified as jitter and removed from the sequence. In general, however, there may be some desired camera motion along with the undesirable camera jitter. Typical intentional camera movements are low frequency, no more than 1-2 Hz, while hand tremor commonly occurs at 2-10 Hz. Thus, low-pass temporal filtering can be applied to the motion estimates to eliminate high frequency jitter.

In addition to having a specific frequency response that eliminates high frequency jitter information; the ideal low-pass filter for this stabilization path also needs to have minimal phase delay. During an intentional panning motion, excessive phase delay can result in much of the initial panning motion being misclassified as jitter. In this case, the stabilized sequence lags behind the desired panning motion of the sequence. Zero-phase filters require non-causal filtering, and cause a temporal delay between the capture of an image and its display on the back of the camera. In a preferred embodiment, a causal filtering scheme is employed that minimizes phase delay without introducing any temporal delay prior to displaying the stabilized image on the camera display.

In a particular embodiment, the motion estimate is low pass temporal filtered to removal the effects of panning, i.e., intentional camera movement. This filtering relies upon a determination that it is reasonable to assume that any desired camera motion is of very low frequency, no more than 1 or 2 Hz. This is unlike hand shake, which is well known to commonly occur at between 2-10 Hz. Low-pass temporal filtering can thus be applied to the motion estimates to eliminate the high frequency jitter information, while retaining any intentional low frequency camera motion.

In preferred embodiments, the stabilized image sequence is available for viewing during capture. This makes undesirable in such embodiments, non-causal, low pass temporal filtering that causes a temporal delay between the capture of an image sequence and display of that sequence. (Non-causal temporal filtering uses data from previous and subsequent images in a sequence. Causal temporal filtering is limited to previous frames.)

Causal temporal filters, unlike non-causal temporal filters tend to exhibit excessive phase delay. This is undesirable in any embodiment. During an intentional panning motion, excessive phase delay can result in much of the initial panning motion being misclassified as jitter. In this case, the stabilized sequence lags behind the desired panning motion of the sequence.

In a particular embodiment, the global motion estimates are input to a recursive filter (infinite impulse response filter), which is designed to have good frequency response with respect to known hand shake frequencies, as well as good phase response so as to minimize the phase delay of the stabilized image sequence. The filter is given by the formula:

$$A[n]=\alpha A[n-1]+\alpha v[n].$$

where:
  A[n] is the accumulated jitter for frame n,
  v[n] is the computed motion estimate for frame n, and
  $\alpha$ is a dampening factor with a value between 0 and 1.

For frame n, the bounding box (also referred to herein as the "output window") around the sensor image data to be used in the stabilized sequence is shifted by A[n] relative to its initial location. The accumulated jitter is tracked independently for the x direction and y direction, and the term v[n] generically represents motion in one of a respective one of the two directions. As a more computationally complex alternative, the filter can be modified to track motion in both directions at the same time. Preferably, this equation is applied independently to the horizontal and vertical motion estimates.

The damping factor $\alpha$ is used to steer the accumulated jitter toward 0 when there is no motion, and that controls the frequency and phase responses of the filter. The damping factor $\alpha$ can be changed adaptively from frame to frame to account for an increase or decrease in estimated motion. In general, values near one for $\alpha$ result in the majority of the estimated motion being classified as jitter. As $\alpha$ decreases toward zero, more of the estimated motion is retained. The suitable value, range, or set of discrete values of $\alpha$ can be determined heuristically for a particular user or category of users or uses exhibiting similar jitters. Typically, hand shake is at least 2 Hz and all frequencies of 2 Hz or higher can be considered jitter. A determination can also be made as to whether the motion estimate is unreliable, for example, motion estimate is unreliable when a moving object, such as a passing vehicle, is mistakenly tracked even though the camera is steady. In that case, the jitter accumulation procedure is modified, by user input or automatically, so as not to calculate any additional jitter for the current frame. The accumulated jitter is, preferably, kept constant if the motion estimate is determined to be unreliable.

The maximum allowed jitter correction is also constrained, as illustrated in FIGS. 6-8. To enforce this constraint, values of A[n] greater than this limit are clipped to prevent correction attempts beyond the boundaries of the original captured image.

In a preferred application in which computational resources are constrained, the jitter correction term is rounded to the nearest integer to avoid the need for interpolation. For YCbCr data in which the chrominance components are sub-sampled by a factor of two in the horizontal direction, it may also be necessary to round the jitter correction to the nearest multiple of two so that the chrominance data aligns properly.

Archival Image Stabilization

The second stabilizer is now described in greater detail. The second stabilizer is designed so that when the jitter component of the motion for frame n is computed, motion estimates from previous and future frames exist, to allow more accurate calculation of jitter than in the first stabilizer, which relies only on current and previous motion estimates.

In a particular embodiment, the buffering and jitter computation scheme used by the second stabilizer includes motion estimates for frames n-k through n+k in computing the jitter corresponding to frame n. As frame n+k becomes available for processing, a motion estimation technique is used to compute the motion for the current frame and add it to the array of motion estimates. It is preferred that the jitter is computed using a non-causal low pass filter. The low-pass filtered motion estimate at frame n is subtracted from the original motion estimate at frame n to yield the component of the motion corresponding to high frequency jitter. The accumulated jitter calculation is given by the following equations:

$$j[n] = v[n] - \sum_{i=n-k}^{n+k} v[i]h[n-i]$$

$$A[n] = A[n-1] + j[n],$$

where j[n] is the jitter computed for frame n. It is the difference between the original motion estimate, v[n], and the low-pass filtered motion estimate given by convolving the motion estimates, v[ ], with the filter taps, h[ ]. The accumulated jitter, A[n], is given by the summation of the previous accumulated jitter plus the current jitter term. A[n] represents the desired jitter correction for frame n.

Given the desired jitter correction term A[n], frame n is accessed from the image buffer, which holds all images from frame n to frame n+k. The sensor data region of frame n to be encoded is adjusted based on A[n]. This data is passed to the video encoder or directly to memory for storage without compression.

The specific value of k used by the filtering and buffering scheme can be chosen based on the amount of buffer space available for storing images or other criteria. In general, the more frames of motion estimates available, the closer the filtering scheme can come to achieving a desired frequency response. The specific values of the filter taps given by h[ ] are dependent on the desired frequency response of the filter, which in turn is dependent on the assumed frequency range of the jitter component of the motion, as well as the capture frame rate of the image sequence.

The specific stabilization techniques disclosed herein can be used in cameras and systems like those earlier described, but which do not provide dual path stabilization.

Features

Features are further described in the following numbered sentences. 1. An image sequence stabilization method comprising the steps of: capturing a sequence of input images; computing a plurality of non-overlapping, horizontal partial projection vectors of each of first and second input images of said sequence; computing a plurality of non-overlapping, vertical partial projection vectors of each of said first and second input images of said sequence; evaluating respective said horizontal partial projection vectors of said first and second images to provide a jitter component in a horizontal direction; evaluating respective said vertical partial projection vectors of said first and second images to provide a jitter component in a vertical direction; and determining a jitter correction from said jitter components. 2. The method of sentence 1 wherein said evaluating steps each further comprise calculating motion estimates from respective said vectors; and temporal filtering respective said motion estimates to provide respective said jitter components. 3. The method of sentence 2 wherein said calculating further comprises: combining the respective said partial projection vectors of said first input image into a plurality of different first composite vectors; combining the respective said partial projection vectors of said second input image into a plurality of different second composite vectors; and comparing respective said first and second composite vectors at different relative offsets. 4. The method of sentence 3 wherein said calculating further comprises selecting best matches of respective said offsets. 5. The method of sentence 4 wherein said calculating further comprises interpolating said offsets of respective said partial projection vectors at increments of less than a full pixel. 6. The method of sentence 4 wherein said selecting further comprises determining a median of respective said best matches. 7. The method of sentence 3 wherein said partial projection vectors of each image in each direction are each a different quarter of a full frame projection vector and said composite vectors include a plurality of different combinations of pairs of respective said partial projection vectors. 8. The method of sentence 7 wherein said composite vectors include combinations of respective said partial projection vectors defining full frame vectors in each of said directions. 9. The method of sentence 2 wherein said filtering further comprises low pass temporal filtering. 10. The method of sentence 1 wherein said evaluating steps each further comprise calculating motion estimates as to each of said vectors; and temporal filtering each of said motion estimates to provide said jitter components for said first image, said filtering using a filter given by the formula: $A[n]=\alpha A[n-1]+\alpha v[n]$ wherein: A[n] is said accumulated jitter for said first image n, v[n] is the respective said motion estimate for said first image n, and $\alpha$ is a dampening factor with a value between zero and one. 11. The method of sentence 1 further comprising the steps of: cropping said first input image to a predetermined output window to provide a first output image; shifting said window by said jitter correction to provide an adjusted window; and cropping said second input image to said adjusted window to provide a second output image. 12. The method of sentence 11 wherein said cropping of said first and second input images is during said capturing. 13. The method of sentence 11 further comprising displaying said output images during said capturing. 14. The method of sentence 11 wherein said images are captured as color filter array data and said method further comprises converting said images from said color filter array data to an imager-independent color space following said cropping. 15. The method of sentence 1 wherein said evaluating steps are mutually independent. 16. The method of sentence 1 wherein said determining further comprises limiting said jitter correction to values that maintain said output window within boundaries of said second input image. 17. The method of sentence 1 wherein said computing steps each further comprise subsampling said input images to provide subsamples and calculating said vectors from said subsamples. 18. A computer program product for image sequence stabilization, the computer program product comprising computer readable storage medium having a computer program stored thereon for performing the steps of sentence 1. 19. An image sequence stabilization method comprising the steps of: capturing a sequence of input images; computing a plurality of non-overlapping, horizontal and vertical partial projection vectors of each of first and second input images of said sequence; combining said horizontal partial projection vectors of said first input image into a plurality of different horizontal first composite vectors and said vertical partial projection vectors of said first input image into a plurality of different vertical first composite vectors; and combining said horizontal partial projection vectors of said second input image into a plurality of different horizontal second composite vectors and combining said vertical partial projection vectors of said second input image into a plurality of different vertical second composite vectors; comparing corresponding said first and second composite vectors at different relative offsets; selecting best matches of respective said offsets and calculating motion estimates in each of said directions from respective best matches; temporal filtering respective said motion estimates to provide respective said jitter components; and determining a jitter correction from said jitter components. 20. The method of sentence 19 wherein said composite vectors include combinations of respective said partial projection vectors defining full frame vectors in each of said directions. 21. The method of sentence 19 wherein said horizontal and vertical jitter components are determined independently. 22. The method of sentence 19 further comprising the steps of: cropping said first input image to a predetermined output window to provide a first output image; shifting said window by said jitter correction to provide an adjusted window; and cropping said second input image to said adjusted window to provide a second output image; and displaying said output images during said capturing. 23. The method of sentence 22 wherein said determining further comprises limiting said jitter correction to values that maintain said output window within boundaries of said respective said images. 24. The method of sentence 19 further comprising zeroing out one of said jitter components when a respective said best match exceeds a predetermined threshold. 25. The method of sentence 19 further comprising zeroing out one of said jitter components when a difference of a respective said best match vector and an average of the remainder of respective said vectors is less than a predetermined threshold. 26. The method of sentence 19 further comprising: ascertaining second and third best offsets of respective said composite vectors of said first and second input images; and zeroing out one of said jitter components when a difference between respective said best match, second best match, and third best match vectors exceeds a threshold. 27. The method of sentence 19 wherein said computing steps each further comprise interpolating one or more of said partial projection vectors of said second image to provide interpolated partial projection vectors. 28. The method of sentence 27 wherein said interpolated partial projection vectors are at offsets of +½ pixel and −½ pixel relative to respective said partial projection vectors of said second image. 29. The method of sentence 19 further comprising: following said ascertaining, interpolating said horizontal partial projection vector of said second image having said best match at additional offsets of +½ pixel and −½ pixel relative to said horizontal partial projection vector of said first image to provide a horizontal partial projection vector triplet, and redetermining a best match among said partial projection vectors of said vector triplet to said partial horizontal projection vector of said first image; and following said ascertaining, interpolating said vertical partial projection vector of said second image having said best match at additional offsets of +½ pixel and −½ pixel relative to said vertical partial projection vector of said first image to provide a horizontal partial projection vector triplet, and redetermining a best match among said partial projection vectors of said vector triplet to said partial vertical projection vector of said first image. 30. The method of sentence 29 wherein said ascertaining steps each further comprise fitting a respective said vector triplet to a distance function. 31. A capture device comprising: an electronic imager capturing a sequence of input images; an image processor receiving said input images from said imager, said image processor determining jitter by computing a plurality of non-overlapping, horizontal and vertical partial projection vectors of each of said input images of said sequence, evaluating respective said partial projection vectors of said first and second images, in each direction, to provide a jitter component in the respective direction, determining a jitter correction from said jitter components, mapping an output window onto said input images based upon said jitter correction; and cropping said input images to said output window to provide corresponding output images; and a display displaying said output images during said capturing. 32. The device of sentence 31 wherein said mapping is non-responsive to panning of said electronic imager.

The invention has been described in detail with particular reference to certain preferred embodiments thereof, but it will be understood that variations and modifications can be effected within the spirit and scope of the invention.

The invention claimed is:

1. An image sequence stabilization method comprising the steps of:
   capturing a sequence of digital images;
   inputting the captured digital images into a computer system;
   generating from said input digital images, a corresponding sequence of archival images and a corresponding sequence of display images;
   automatically applying a first stabilization path to reduce jitter in the sequence of archival images and stabilizing said archival image sequence to provide a stabilized archival image sequence;
   automatically applying a second stabilization path to reduce jitter in the sequence of display images and stabilizing said display image sequence differently than said stabilizing of said archival images to provide a stabilized display image sequence.

2. The method of claim 1 further comprising displaying said stabilized display image sequence during said capturing.

3. The method of claim 2 further comprising discarding each of said images of said stabilized display image sequence following said displaying and keeping only said images of said archival image sequence.

4. The method of claim 3 further comprising the steps of:
   storing said stabilized archival image sequence to provide a stored image sequence; and
   allowing retrieval of said stored image sequence following said displaying of said stabilized display image sequence.

5. The method of claim 2 wherein said stabilizing of said archival image sequence follows said displaying.

6. The method of claim 2 further comprising automatically deleting each of said images of said display image sequence following said displaying of the respective said image.

7. The method of claim 6 wherein both said stabilizing steps begin concurrently and said stabilizing of said display image sequence is completed prior to completion of said stabilizing of said archival image sequence.

8. The method of claim 6 further comprising wherein said stabilizing of said archival image sequence follows said deleting.

9. The method of claim 1 wherein said stabilizing of said display image sequence is independent of said stabilizing of said archival image sequence.

10. The method of claim 1 wherein both said stabilizing steps begin concurrently and said stabilizing of said display image sequence is completed prior to completion of said stabilizing of said archival image sequence.

11. The method of claim 1 wherein said stabilizing of said archival sequence is rearward-looking and forward-looking, and said stabilizing of said display sequence is only rearward-looking.

12. The method of claim 1 wherein said stabilizing steps each further comprise cropping each image of the respective said image sequence, said cropping being irreversible.

13. The method of claim 1 wherein said stabilizing steps each further comprise digitally stabilizing respective said image sequences.

14. The method of claim 1 wherein said generating further comprises reducing resolution of said display images.

15. An image sequence stabilization method comprising the steps of:
capturing a sequence of images;
inputting the captured sequence of images into a computer system;
replicating said image sequence to provide a first copy and a second copy;
automatically applying a first stabilization path to reduce jitter in the first copy of images and digitally stabilizing said first copy to provide a display sequence;
automatically applying a second stabilization path to reduce jitter in the second copy of images and digitally stabilizing said second copy differently than said first copy to provide an archival sequence;
displaying said display sequence concurrent with said capturing.

16. The method of claim 15 further comprising automatically discarding said display sequence following said displaying.

17. The method of claim 16 further comprising automatically storing said archival sequence.

18. The method of claim 17 wherein said displaying further comprising subsampling said display sequence and said storing further comprises compressing said archival sequence.

19. The method of claim 16 wherein said stabilizing of said second copy is slower than said stabilizing of said first copy.

20. An image sequence stabilization system comprising:
means for capturing a sequence of images;
means for replicating said image sequence to provide a first copy and a second copy;
means for automatically applying a first stabilization path to reduce jitter in the sequence of the first copy of images and digitally stabilizing said first copy to provide a display sequence and for automatically applying a second stabilization path to reduce jitter in the sequence of the second copy of images and digitally stabilizing said second copy differently than said first copy to provide an archival sequence;
a display displaying said display sequence concurrent with said capturing;
an encoder automatically compressing said archival sequence.

21. A camera comprising:
an electronic imager capturing a sequence of input images;
a replicator replicating said sequence of input images to provide an archival image sequence and a display image sequence;
memory storing said archival image sequence;
a control unit receiving said display image sequence, said control unit having a display sequence stabilizer applying a first stabilization path to reduce jitter in the sequence of display images and stabilizing said display image sequence to provide a stabilized display image sequence; and
a display displaying said stabilized display image sequence during said capturing;
wherein said control unit automatically deletes said display image sequence following said displaying; and
wherein said control unit has an archival sequence stabilizer applying a second stabilization path to reduce jitter in the archival image sequence and stabilizing said archival image sequence independent of said stabilizing of said display image sequence.

22. The camera of claim 21 wherein said display sequence stabilizer is computationally simpler than said archival sequence stabilizer.

23. The camera of claim 21 wherein said stabilizing by said archival sequence stabilizer is rearward-looking and forward-looking, and said stabilizing by said display sequence stabilizer is only rearward-looking.

24. The camera of claim 21 wherein said stabilizing irreversibly crops each image of the respective said image sequences.

25. The camera of claim 21 wherein said display sequence stabilizer digitally stabilizes said display sequence.

26. An image sequence stabilization method comprising the steps of:
capturing a sequence of input images;
inputting the captured input images into a computer system;
computing a plurality of non-overlapping, horizontal partial projection vectors of each of first and second input images of said sequence;
computing a plurality of non-overlapping, vertical partial projection vectors of each of said first and second input images of said sequence;
evaluating respective said horizontal partial projection vectors of said first and second images to determine a jitter component in a horizontal direction;
evaluating respective said vertical partial projection vectors of said first and second images to determine a jitter component in a vertical direction; and
determining a jitter correction from said jitter components;
applying the jitter correction to a sequence of archival images to provide a stabilized archival image sequence; and
applying the jitter correction to a sequence of display images to provide a differently stabilized display image sequence from said stabilized archival images.

27. The method of claim 26 wherein said evaluating steps each further comprise calculating motion estimates as to each of said vectors; and
temporal filtering each of said motion estimates to provide said jitter components for said first image, said filtering using a filter given by the formula:

$$A[n]=\alpha A[n-1]+\alpha v[n]$$

wherein:
$A[n]$ is said accumulated jitter for said first image n,
$v[n]$ is the respective said motion estimate for said first image n, and $\alpha$ is a dampening factor with a value between 0 and 1.

* * * * *